Sept. 9, 1969     A. DUNN ET AL     3,466,429
ENCODING APPARATUS ASSOCIATED WITH A CALCULATING MACHINE
Filed Nov. 6, 1967     11 Sheets-Sheet 1

ALEXANDER DUNN.
GEORGE TURNER LIVINGSTON.
ALBERT J. CORR.
BY *Edwin Olsen*
AGENT.

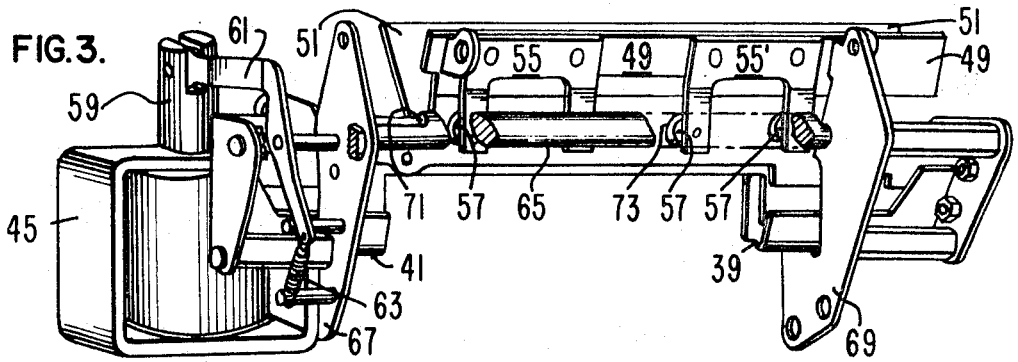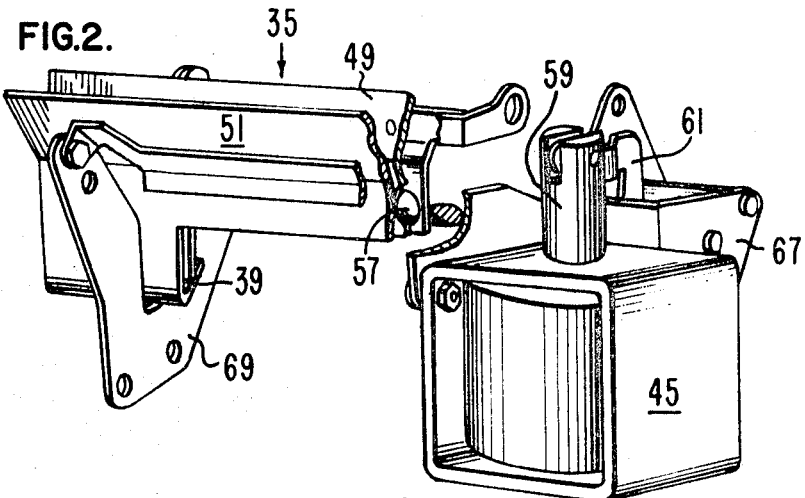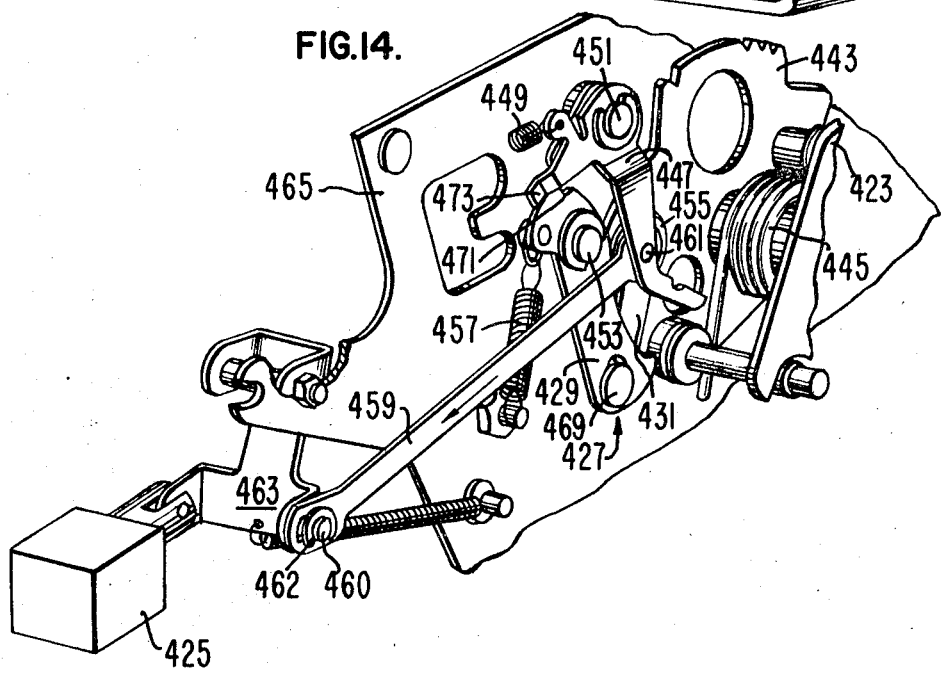

United States Patent Office 3,466,429
Patented Sept. 9, 1969

3,466,429
ENCODING APPARATUS ASSOCIATED WITH A CALCULATING MACHINE
Alexander Dunn, Parkhall, Clydebank, and George Turner Livingston, High Mains, Dumbarton, Scotland, and Albert J. Corr, Detroit, Mich., assignors to Burroughs Corporation, Detroit, Mich., a corporation of Michigan
Filed Nov. 6, 1967, Ser. No. 680,767
Int. Cl. G06c 29/00; G06k 19/00
U.S. Cl. 235—60.11
10 Claims

ABSTRACT OF THE DISCLOSURE

A full keyboard calculator is combined within a unitary case with an amount and transaction number encoder. A single keyboard provides entry of amounts to be computed or printed on a paper tape, or encoded in magnetic ink on a check or other document. Encoding is accomplished by activating an impressor roller across a plurality of encoding wheels in serial fashion. Mechanical and electromechanical means associated with the calculator are activated to selectively index the encoding wheels and to cause the impressor roller to transversely press the check and the magnetic ribbon against each order of the indexed wheels.

BACKGROUND OF THE INVENTION

A great number and variety of full keyboard desk model printing calculators have been known which provide essentially the same facility as the preferred embodiment of the present invention for printing, accumulating, subtotaling and totaling numerical amounts. Such a printing calculator is disclosed in United States Patents 1,853,050 through 1,853,055 and in United States Patent 1,908,358. A current version of a printing calculator of this type is embodied in the Burroughs Series P line of machines which is generally known in both the domestic and international business machine markets.

An amount and transaction number encoder effective for encoding amounts in magnetic ink characters which conform to the E–13B Font Specification was disclosed in a U.S. application of Thut et al., filed on Apr. 16, 1964 and identified as Ser. No. 360,338, now Patent No. 3,363,547, which was assigned to the assignee of the present invention. The invention of Thut et al. filled a need in the gradual transition of the banking industry from an early stage in which checks were mechanically posted to customer's ledgers to a more current stage which is characterized by a completely automatic system of handling checks, including sorting by clearing house, bank and customer number, and updating of the customer's account in keeping with amounts withdrawn. Although the transition from the posting stage to the automatic handling stage was made possible through the adoption of the common machine language afforded by the E–13B magnetic ink characters, such characters being both machine readable and readable by the human eye, the transition has nevertheless been gradual and fraught with numerous intervening needs. A first step in this gradual transition was the pre-printing of blank checks in magnetic characters corresponding with the bank code number and the customer's account number. Such pre-printing permitted the automatic sorting of checks by clearing house number, bank number and customer account number, but failed to provide for the automatic updating of customer accounts. Before automatic updating could be realized, amounts corresponding to the amounts withdrawn by the customer had to be printed in magnetic ink characters in a designated field on each submitted check. It was to this need that the Thut et al. invention was directed, providing as it did for the encoding of withdrawn amounts in magnetic ink characters of the required font, intensity and uniformity.

The desirability of combining an amount encoder of the type disclosed by Thut et al. with a general-purpose, full keyboard calculating machine was increasingly felt by commercial banks, particularly in view of space limitations in teller's cages and in view of the trend toward multipurpose equipment. It was this desire for multi-purpose equipment, together with the prevailing need for an amount encoder, that gave rise to the calculator-encoder invention of Monticello et al. disclosed in U.S. Patent 3.018,721 which was also assigned to the assignee of the present invention. This advancement in the banking art provided an encoding station disposed beneath a full keyboard printing calculator, such station having ingress chute and transport means leading thereto, and provided also for the use of interposers and hammers for encoding individual checks according to amounts indexed in the calculator keyboard.

SUMMARY OF THE INVENTION

The preferred embodiment of the present invention combines the Thut et al. system of encoding with a full keyboard calculator in a compact and completely portable unit that is freely movable from place to place in a teller's cage or banking office wherever a minimum of counter or desk space is available. An economical and efficient multipurpose machine is accordingly provided which is effective for performing mathematical computations, for producing transit slips and tapes of itemized entries, and for encoding checks in magnetic ink characters which fully meet the high standards of registration, intensity and uniformity that are required.

An object of the present invention, accordingly, is to provide a completely portable multi-purpose machine which is effective for performing arithmetic computations, for printing transit slips and itemized tapes, and for encoding checks in machine redable characters according to the amounts written in longhand thereon.

Another object of the invention is to provide a calculating and encoding machine wherein the keyboard of the calculator is employed for selectively indexing the encoding wheels, and the power and drive means of the calculator are also utilized for actuating the encoding means.

A further object of the invention is to provide a calculating and encoding machine wherein the encoding station and encoding means are located in the proximity of a document ingress and egress chute, to thereby relieve the need of transporting the checks to and from the encoding station.

Another object of the present invention is to provide a calculating and encoding machine which is economical to build and maintain, such economy arising through the elimination of transport means and means for controlling and safeguarding such transport means.

An additional object of the present invention is to provide an encoding calculator wherein encoding may be accomplished in minimal time and with a maximum of convenience, a time advantage being realized by way of encoding the check at the point of ingress, and optimum convenience being achieved through manipulation of the well-known calculator keyboard.

Still another object of the present invention is to provide a calculating and encoding machine that utilizes the Thut et al. principle of encoding, wherein an impressor roller or printing platen is activated transversely across the surface of the indexed encoding wheels, to thereby provide an optimum quality of the printed magnetic ink characters.

An important aspect of the invention is the adaptation and improvement of calculator actuating means to accommodate the selective indexing requirements of encoding, such adaptation rendering the calculator keyboard effective for selectively positioning a plurality of encoding wheels according to the amounts entered therein.

Another aspect of the invention is the adaptation and improvement of the power and drive means of the calculator to effectuate the encoding function, such adaptation and improvement providing an efficient and reliable device which is capable of producing a uniformly high quality of printed magnetic ink characters.

Other important aspects of the invention include the use of various mechanical and electromechanical means for assuring a consistently high quality of encoding, such means being effective to assure, as an example, that various conditions are present before an encoding operation is initiated, such as: (a) a check is properly positioned in the encoding station, (b) an ample supply of magnetic inked ribbon is present and in proper position, and (c) the encoding wheels are fully indexed.

Another aspect of the invention is the use of an improved toggle (toggle disclosed in U.S. Patent 1,853,050), in conjunction with electromechanical means referred to above, to allow the encoding wheels to be properly positioned before an encoding operation begins.

BRIEF DESCRIPTION OF THE DRAWINGS

These and other objects, aspects and advantages of the invention will be more clearly understood from the following description when read in conjunction with the accompanying drawings, in which:

FIGURE 2 is a front view of the document chute and the encoding station;

FIGURE 3 is a rear view of the document chute and encoding station showing mechanism for holding a check in proper registrational position in such station;

FIGURE 12 is a top view of the encoder head section showing the impressor roller in its home position and means for transversely activating the roller;

FIGURE 14 is a sectional perspective view taken from the left rear corner showing the improved calculator toggle mechanism.

DETAILED DESCRIPTION OF THE INVENTION

General construction

Figure 1:
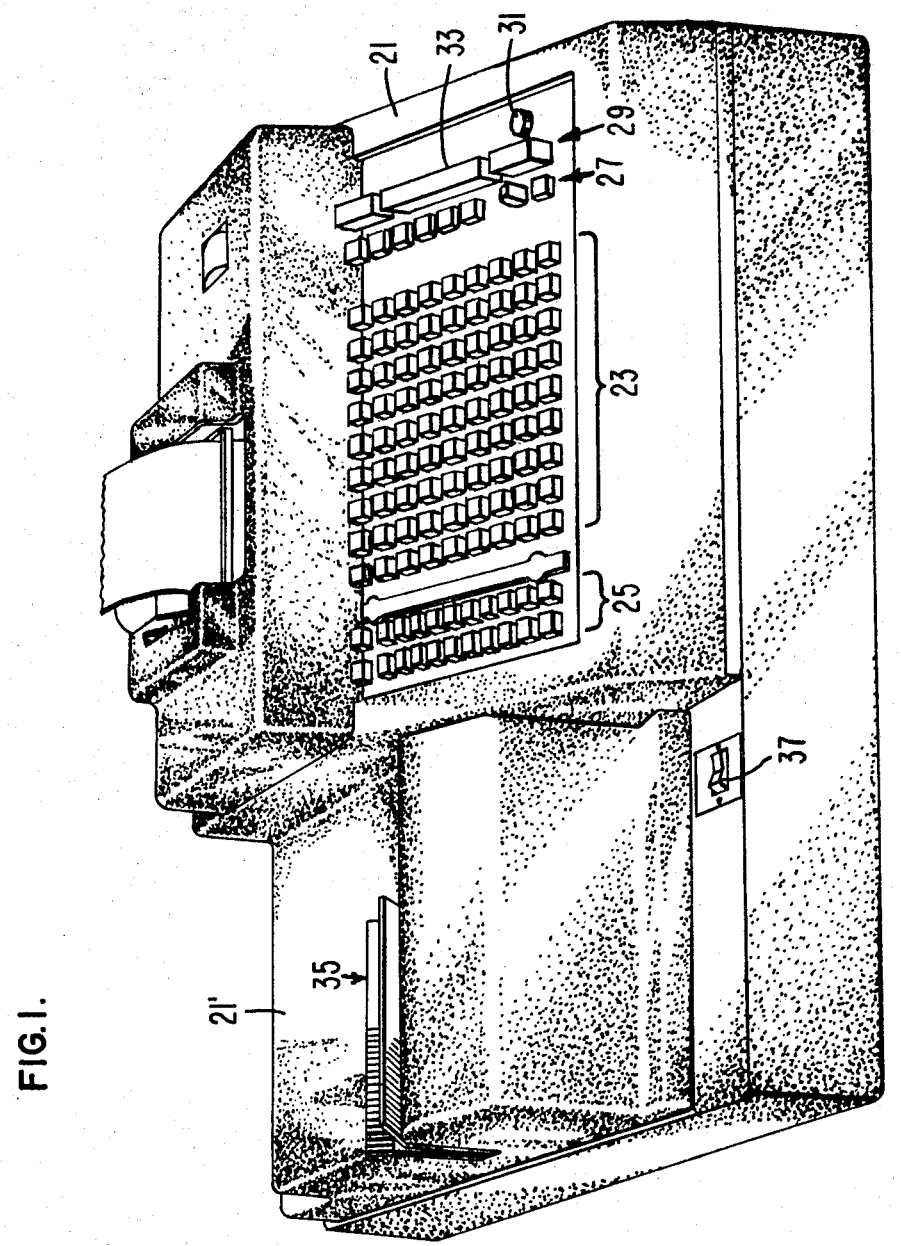
FIGURE 1 is a front view of the machine case showing the calculator keyboard and a document chute disposed to the left thereof.

With reference to FIGURE 1, the preferred embodiment of the invention comprises a printing calculator, of the Burroughs Series P type, and a check encoder contained within a unitary case 21. The printing calculator is disposed in the rightmost portion of the case 21, and the check encoder is disposed to the left thereof. The keyboard of the calculator comprises ten columns of amount keys 23, two columns of transaction code keys 25, a column of operation control keys designated at 27, and various motor bars designated at 29 including an item bar 33. A ribbon warning lamp 31 disposed to the right of the motor bars 29 illuminates to signal the operator that a supply of magnetic inked ribbon is not available or is not otherwise in satisfactory condition for encoding, as explained in a later section. A vertically disposed document chute 35 provides ingress of checks into an encoding station which is located within the case portion 21'. An encoding switch 37 located near the front of the case portion 21' is a two-position switch effective for selectively conditioning the encoding calculator for either an encoding or a non-encoding operation.

The encoding section of the embodiment, housed within the case portion 21', comprises a plurality of encoding wheels, an encoder head section, and indexing and actuating means as will be explained in detail in appropriate sections hereinafter. Depression of the amount keys 23 and the motor bar 33, in the calculator keyboard, will result in an encoding operation in which the encoding wheels are selectively indexed according to the values of the keys depressed, and an impressor roller is transversely activated across the surface of the wheels by the rotation of an encoder drive shaft, such transverse activation of the impressor roller being effective to press the check and the ribbon against each order of the indexed wheels.

Various mechanical and electrical means, which are also described in detail in subsequent sections, are utilized to assure effective encoding and to securely hold a check in proper registrational position in the document chute and encoding station designated at 35 in FIGURE 1.

Document holding mechanism

With reference to FIGURES 2 and 3, a check inserted into the document chute 35 drops between a frontplate 51 and a backplate 49 of a combined document chute and encoding station, and assumes a resting position against bottom-edge switches 39 and 41 which provide proper bottom edge alignment of a check in the encoding station. Right-edge alignment of a check in the encoding station is provided by manually sliding the check to the right and into right-edge contact with a limit plate 67, or through employment of the "Document Positioning and Eject Device" disclosed in a copending U.S. application of the same title, Ser. No. 671,836, filed Sept. 29, 1967, which device is effective for aligning and holding a check or other document in a "read" or "write" station.

Figure 15:
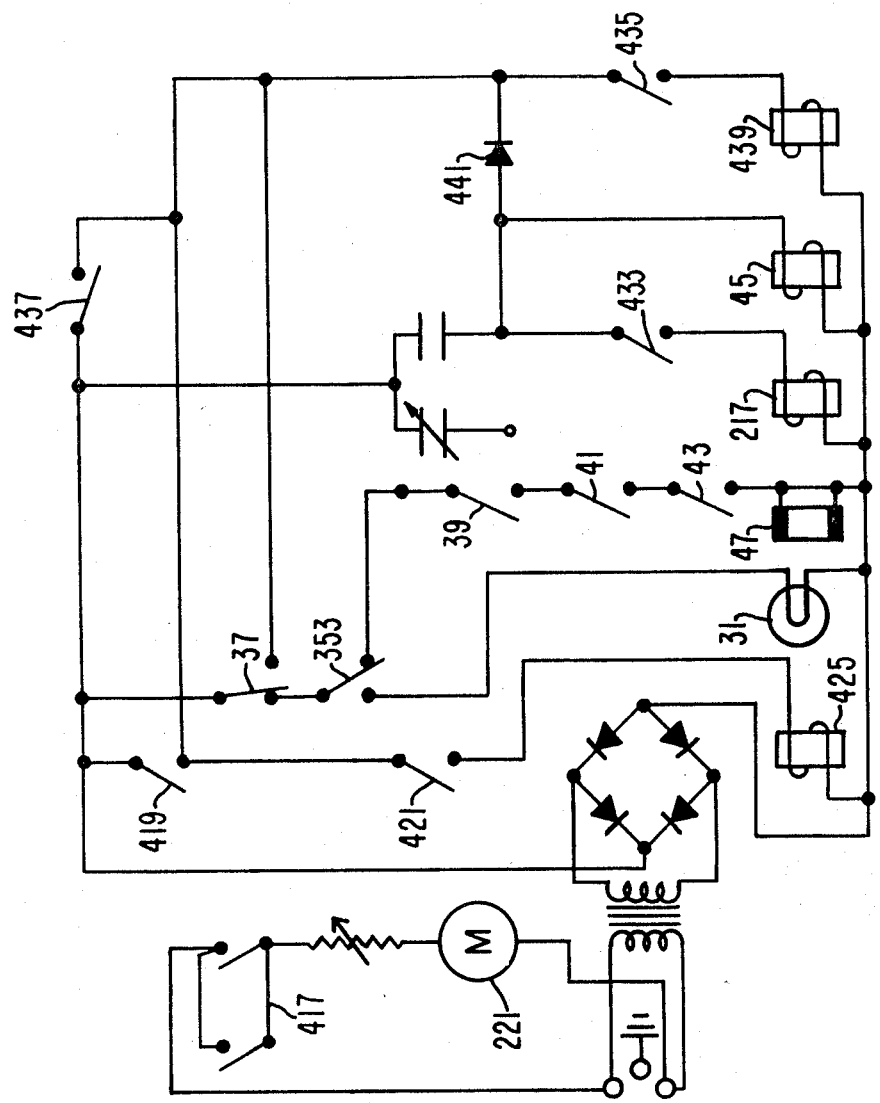
FIGURE 15 is a schematic diagram showing circuitry and electromechanical elements which are suitable for one embodiment of the invention.

When the check to be encoded is properly positioned against the bottom-edge surfaces in the chute 35 and in right-edge contact with the limit plate 67, three switches (not shown in FIGURE 2 or 3 but designated as switches 39, 41 and 43 in FIGURE 15) are closed to thereby channel current to a solenoid 45 by way of a relay 47 (FIGURE 15). The resulting energization of the solenoid 45 causes a plunger 59 of the solenoid to be retracted to thereby rock a plunger lever 61 in a counterclockwise direction (as viewed in FIGURE 3). The plunger lever 61 is fixed by means of a flatted surface and fitted keyway to a cam shaft 65 which is pivotally supported by the limit plate 67 and a frame member 69. The counterclockwise rocking of the plunger lever 61, against the bias of a spring 63, causes a raised portion 71 of the cam shaft 65 to be lowered into contact with the finger springs of finger spring assemblies 55 and 55' to thereby activate the finger springs in the direction of the front plate 51.

Each of the finger springs of the finger spring assemblies 55 and 55' comprises a ball tip 57 which extends forwardly from its front surface through an aperture 73 in the backplate 49. The ball tips 57, accordingly, are effective to securely hold a check against the frontplate 51 throughout an encoding operation, their contact against the frontplate 51 being retained by the continued energization of the solenoid 45 and the continued counterclockwise positioning of the plunger lever 61 and the cam shaft 65.

Encoder indexing mechanism

Figure 4:
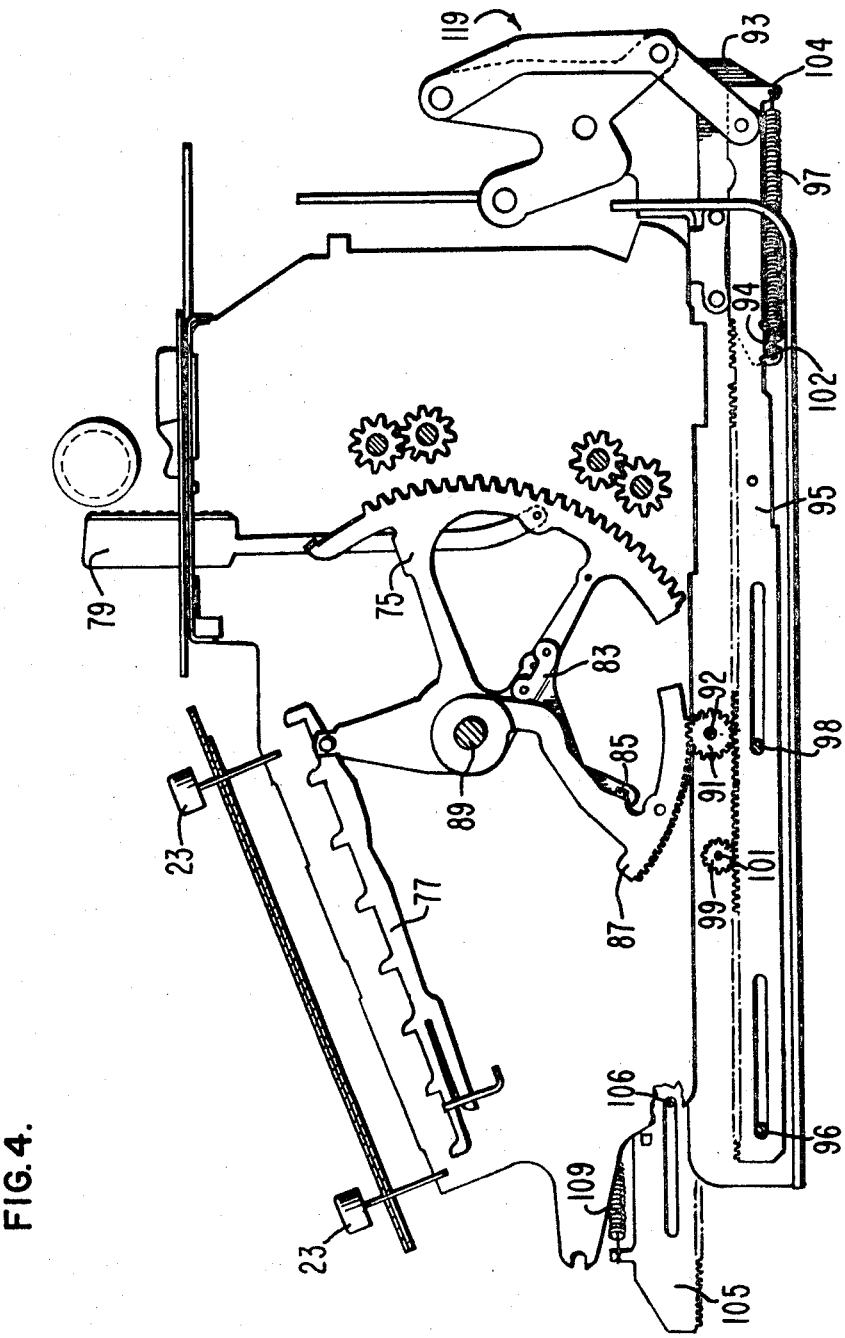
FIGURE 4 is a sectional right side elevation showing various calculator parts and a portion of the mechanism connecting the calculator to the encoding section.
Figure 5:
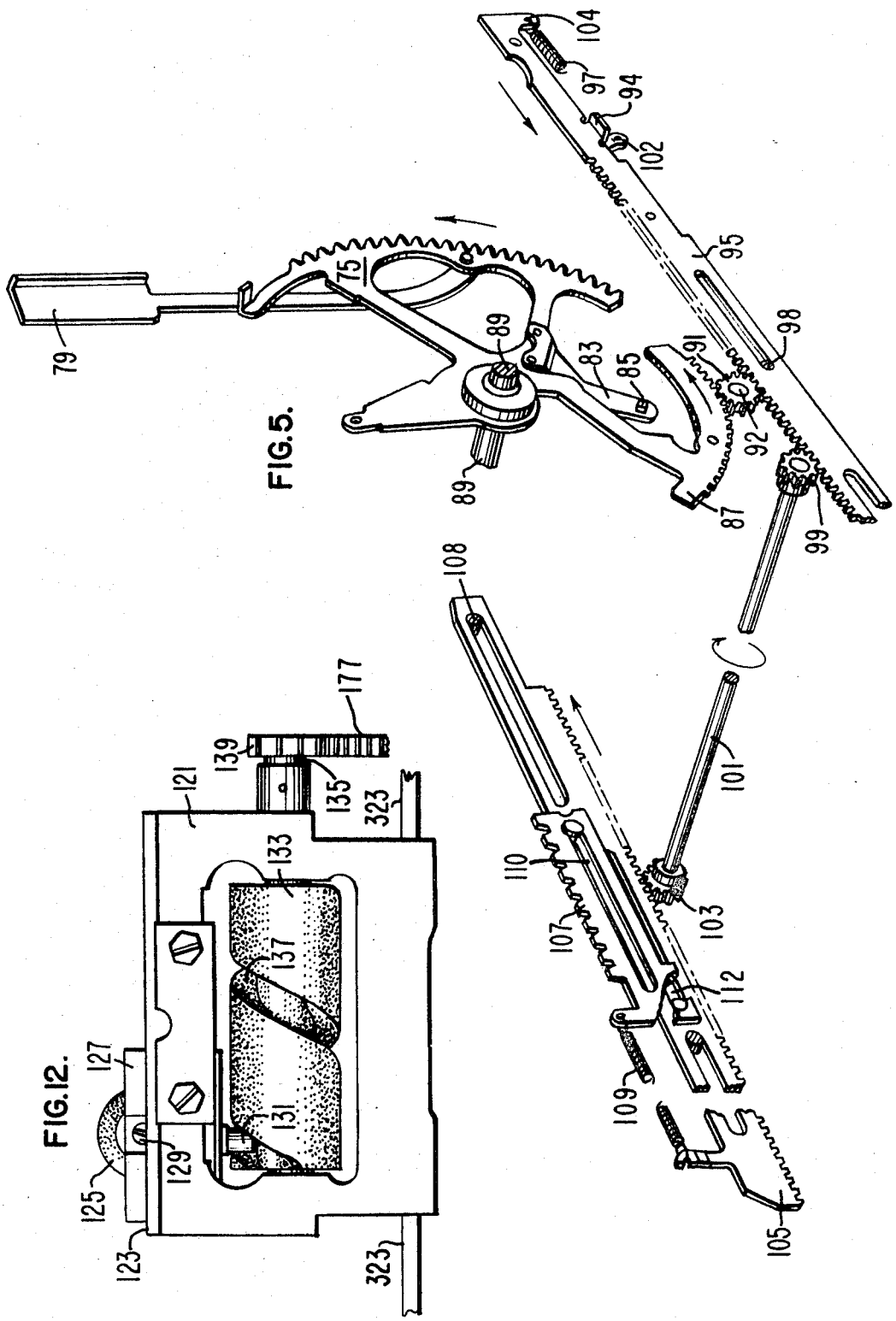
FIGURE 5 is a perspective sectional view taken from the right front corner showing the connecting mechanism in greater detail.

With reference to FIGURES 4 and 5, a sensing arm 83 is rigidly attached to each of the adding sectors 75 of the printing calculator, and an adjacent auxiliary sector 87 is independently rotatable on a shaft 89. A limit stud 85 disposed on each of the sensing arms 83 provides a rocking limit for the rightwardly adjoining auxiliary sector 87 when the latter sector is rocked in a counterclockwise direction during the indexing of its respective encoding wheel. Each of the auxiliary sectors 87 cooperates with a separate auxiliary pinion 91 which is freely rotatable on a common shaft 92. The auxiliary pinions 91 also cooperate with teeth on the upper edge of individual code racks 95 of corresponding order, said code racks 95 being slidable forwardly and rearwardly (to the left and right, respectively, as shown in FIGURE 4) on supporting shafts 96 and 98 journaled in the machine side frames.

Figure 6:
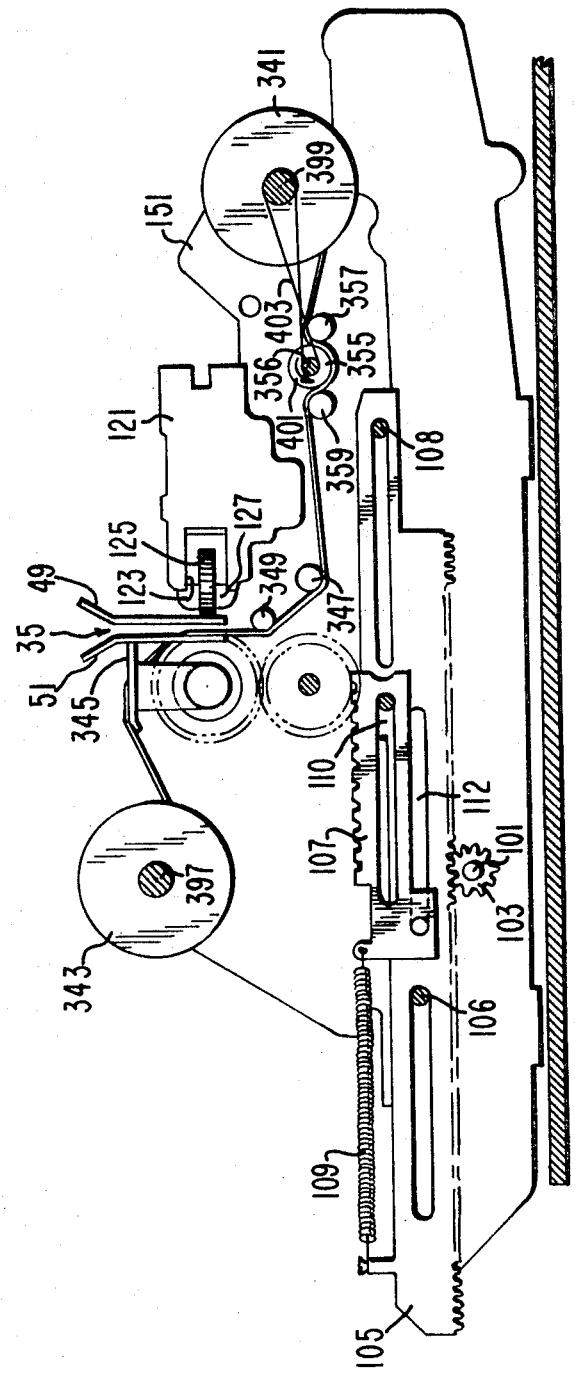
FIGURE 6 is a sectional right side elevation of the encoding section showing the relationship of encoding parts and the encoder portion of the connecting mechanism shown in FIGURE 5.

A pinion 99 cooperating with and corresponding to each order of the code racks 95 is fixed at an appropriate point on the rightmost portion of a respective shaft assembly 101 (FIGURE 5), each of said shaft assemblies comprising also a pinion 103 fixed to the leftmost portion thereof and cooperable with a code bar 105 of corresponding order. The code bars 105 are slidable rearwardly and forwardly (to the right and left, respectively, as viewed in FIGURE 5) on support shafts 106 and 108 (FIGURE 6). A toothed slide 107 is supportively carried by each code bar 105, upon which it is normally held in a forward position (leftwardly as viewed in FIGURES 5 and 6) by a spring 109, and upon which it may be slid rearwardly against the bias of the spring 109 as permitted by a pair of slots 110 and 112. An intermediate code wheel 111 (FIGURE 9) of corresponding order is engaged with the teeth on the upper surface of each toothed slide 107, and engaged also with an encoding wheel 113 which carries character type ranging from 0 through 9 on its outer periphery, said character type conforming with the E–13B specification for magnetic ink characters.

An encoding operation is initiated when a check is inserted into the encoding station designated at 35 (FIGURE 1), the encoding switch 37 is set to its "encode" position, and the amount keys 23 and the motor bar 33 are depressed. During this encoding operation, the indexing mechanism operates in a manner hereinafter described with reference to FIGURES 4, 5, and 6. Index bars 77 corresponding to the depressed keys 23 are activated forwardly through conventional calculator means to be limited against the indexed keystems, and the adding sectors 75, which are pivotally connected to the index bars 77, are rotated in a counterclockwise direction a distance corresponding to the value of the keys depressed. During this counterclockwise rotation of the adding sectors 75, the attached sensing arms 83 are also rotated in a counterclockwise direction to effectively move the limit studs 85 a corresponding distance away from their respective auxiliary sectors 87 in a rearward direction (to the right as viewed in FIGURE 4). The counterclockwise rotation of the adding sectors 75, in addition to selectively positioning the sensing arms 83 and the limit studs 85, is also effective to raise the type bars 79 into position for printing in nonmagnetic ink on a conventional paper tape.

At a predetermined point in the encoding operation, as will be explained in a later section, a drive plate rocker assembly 119 is rotated in a clockwise direction by means of an encoder drive shaft, and a drive plate 93 attached to the lower extremity of the rocker assembly 119 is activated forwardly (to the left as viewed in FIGURE 4). Forward activation of the drive plate 93 effectively releases the individual code racks 95 which are normally retained in their rearward home position by the contact of depending projections 102 on the forward extremity of the drive plate 93 with individual offset projections 94 on the code racks 95. Upon release of the offset projections 94, the code racks 95 are permitted to move forwardly under the power of their individual springs 97, such springs being anchored to projections 104 disposed on the rearward extremity of the code racks 95 and to the corresponding projections 102 on the forward extremity of the drive plate 93. As the code racks 95 move forwardly, the corresponding auxiliary pinions 91 are rotated in a clockwise direction to thereby rotate their respective auxiliary sectors 87 in a counterclockwise direction until limited by the limit studs 85 of their respective prepositioned sensing arms 83. This forward travel of the code racks 95, according to the digit values indexed in corresponding columns of the keyboard, is also effective to rotate the pinions 99 of the various shaft assemblies 101 in a clockwise direction, to thereby activate the corresponding code bars 105 rearwardly (to the right as viewed in FIGURES 4 and 6) through the clockwise rotation of the shaft assemblies 101 and the pinions 103. Rearward movement of the code bars 105 and the toothed slides 107 (FIGURE 6) is effective to rotate the intermediate code wheels 111 (FIGURE 10) in a counterclockwise direction, and the encoding wheels 113 in a clockwise direction, to thereby locate characters corresponding to the values indexed in encoding positions, said position being definable as the nine o'clock position of the wheels 113 as viewed in FIGURE 10. As explained in a later section under the subject "Drive Shaft Mechanism," an encoder drive shaft activates a detent shaft 115 into retentive engagement with the teeth of the intermediate code wheels 111, and a detent blade 117 is activated into engagement with the notches in the encoding wheels 113, to effectively retain the encoding wheels in proper indexed position throughout the encoding operation.

The code racks 95 and the code bars 105 are restored rearwardly and forwardly, respectively, at a predetermined point in the rotational activation of the encoder drive shaft, as the drive plate 93 is restored rearwardly by the counterclockwise rotation of the drive plate assembly 119. Rearward restoration of the code racks 95 is accomplished through contact of the depending projections 102 of the drive plate 93 with the offset projections 94 of the individual code racks 95. Forward restoration of the code bars 105 is accomplished through the counterclockwise rotation of the pinions 99 and 103 of the shaft assemblies 101. Since the restoration of the code bars 105 is effectuated before the detent shaft 115 and the detent blade 117 (FIGURE 10) are disengaged from the intermediate wheels 111 and the encoding wheels 113, respectively, such restoration is accompanied by the expansion of the springs 109 (FIGURE 6) which normally bias the toothed slides 107 forwardly on their respective code bars 105. Rearward restoration of the code racks 95 (FIGURE 4) is also effective to rotate the auxiliary sectors 87 in a clockwise restorational direction through the counterclockwise rotation of the auxiliary pinions 91. The index bars 77, type bars 79, adding sectors 75 and sensing arms 83 are restored to their respective home positions during the return stroke of the printing calculator as a conventional restoring shaft (not shown) activates the adding sectors 75 in a clockwise direction, such restoration occurring after the code racks 95 and the auxiliary sectors 87 have been restored by the drive plate 93. At a predetermined later point in the rotational activation of the encoder drive shaft, the detent shaft 115 (FIGURE 10) and the detent blade 117 are disengaged from the wheels 111 and 113, respectively, to thereby permit the expanded springs 109 (FIGURE 6) to restore the toothed slides 107 to their forward home positions on their respective code bars 105.

Encoding mechanism

Figure 9:
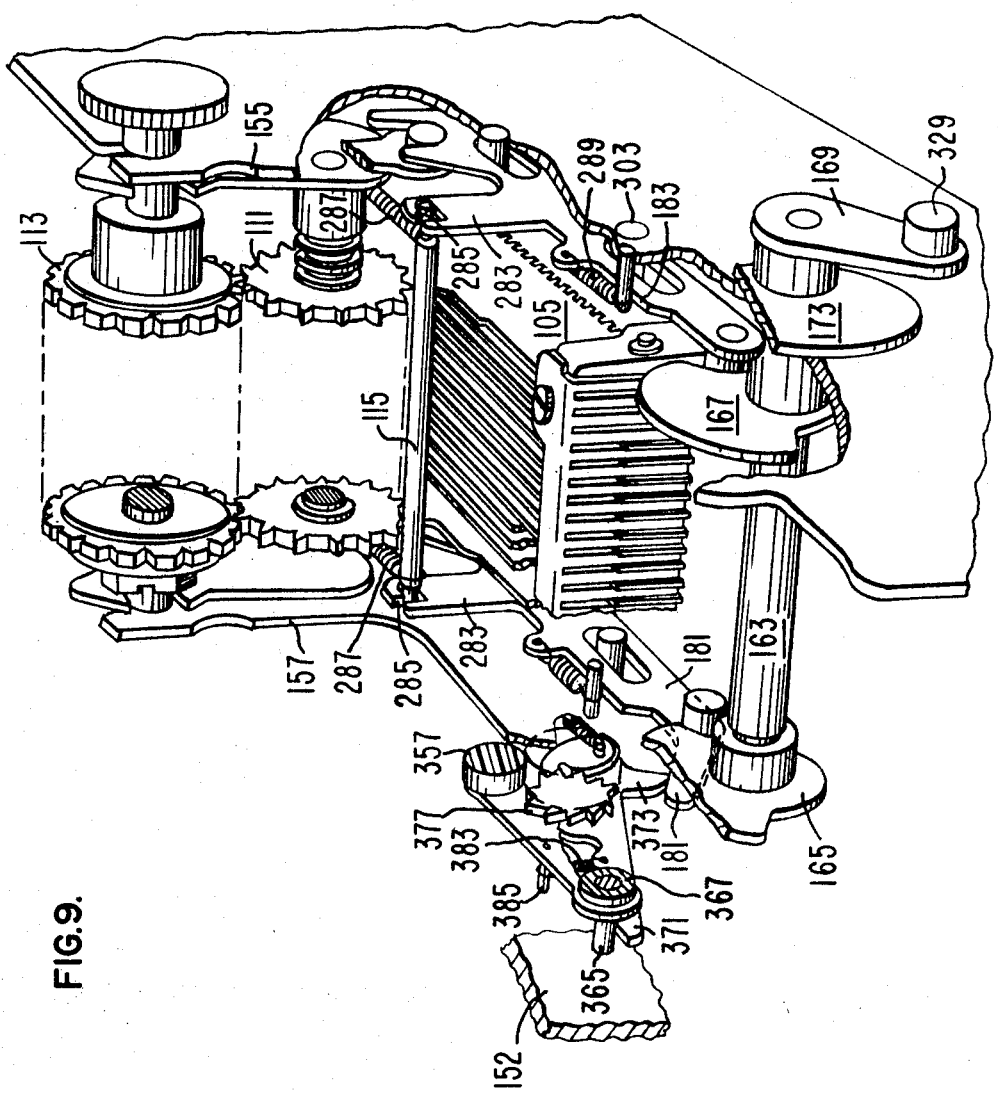
FIGURE 9 is a perspective view of the encoding wheels and intermediate wheels taken from the left rear corner.
Figure 13:
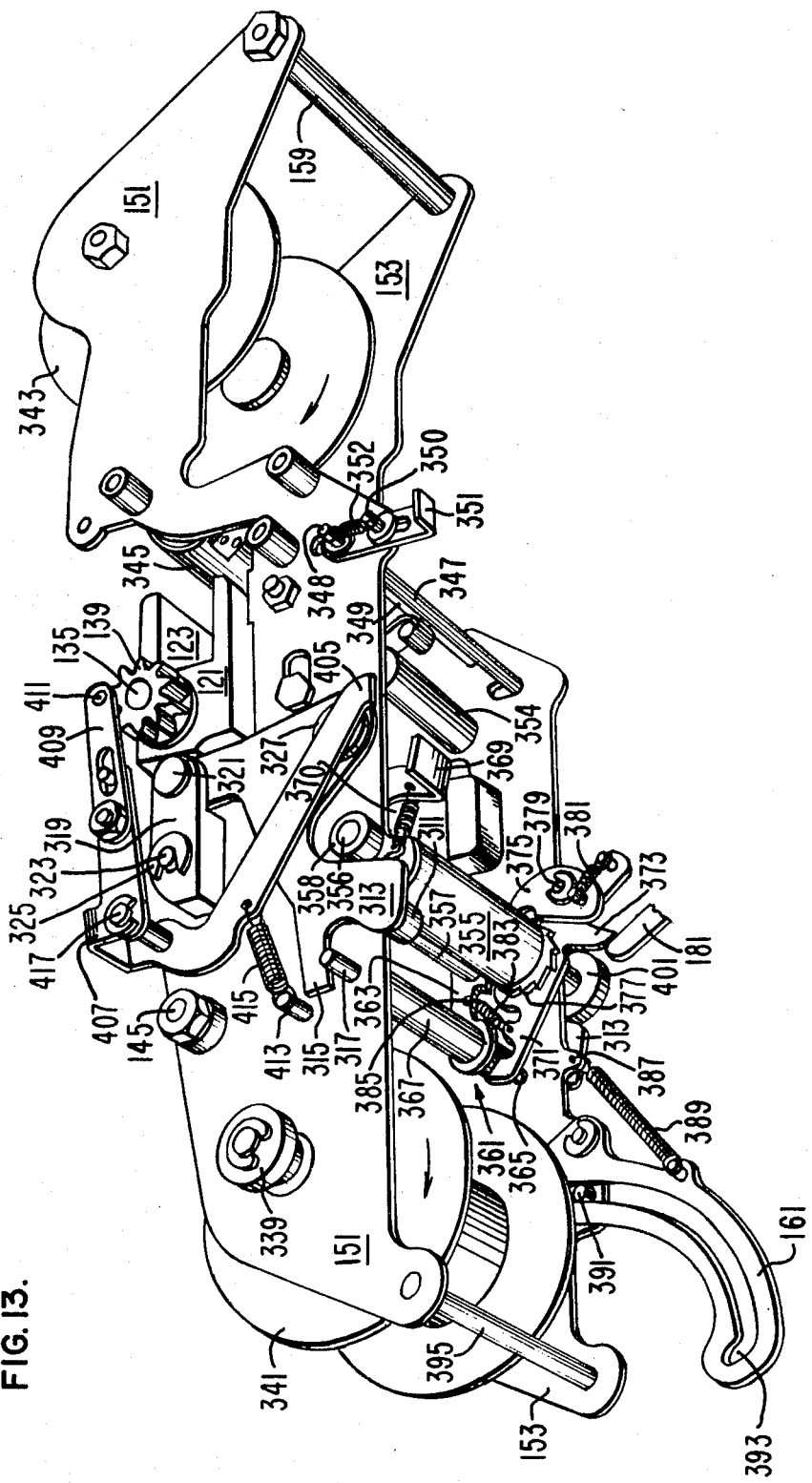
FIGURE 13 is a left perspective elevation of the ribbon mechanism shown in relationship with the encoder head section and head advancing means.

The encoding mechanism is comprised of the encoding wheel assembly shown in FIGURE 9 which is disposed between the stationary frame members 155 and 157 and forwardly of the document chute 35 (FIGURE 6), and a head section 121 carried by tiltable frame members 151 and 153 (FIGURE 13) which is disposed rearwardly of the document chute 35 (FIGURE 6). The head section, as well as a related ribbon mechanism shown in FIGURE 13, is tiltable on a shaft 395 which pivotally connects the tiltable members 151 and 153 to the stationary members 155 and 157, and is latchable in an upright tilted position by a latch 161 for ribbon changing purposes as explained in a subsequent section.

The head section 121 carried by the tiltable frame members 151 and 153 (FIGURE 13) can best be explained with reference to FIGURE 12. A yoke portion 123 formed in the rearmost surface of the head section 121 is best shown in FIGURE 13. A slideable block 127 (FIGURE 12) is transversely movable within the yoke portion 123 and carries an impressor roller 125 disposed in a formed slot therein, the impressor roller 125 being freely rotatable on a pin support 129. A roller stud 131 disposed on the slidable block 127 on the side opposite the impressor roller 125 is engaged with a spiral groove 137 in a cam roller 133, the latter cam roller being fixed to a shaft 135. A pinion 139 attached to the left extremity (right extremity as shown in FIGURE 12) of the shaft 135 serves to impart rotational movement to the cam roller 133, to thereby activate the roller stud 131, the block 127 and the impressor roller 125 in a transverse direction with respect to the head section 121, as hereinafter described. The head section 121 is normally held in its rearward inactive position as shown in FIGURE 13 by means of a pair of springs 143 and 144 (FIGURE 11), the rearward ends of which are attached to a shaft 145 supported between the tiltable frame members 151 and 153, and the forward ends of which are attached to a shaft 141 fixed to the head section 121 by means of plates 147 and 149. The head section 121 is advanced forwardly into encoding position (to the right as viewed in FIGURES 11 and 13) against the bias of the springs 143 and 144 at a predetermined point in the encoding operation, as explained in the succeeding section.

Drive shaft mechanism

The encoder drive shaft mechanism provides the motivating power for the various functions that are involved in an encoding operation, and establishes a timing relationship between such functions and the various functions of the printing calculator. This mechanism comprises an encoder drive shaft which latitudinally disposed across the rear of the machine, means for rotationally activating the drive shaft, and a plurality of cams and levers effective for activationally accomplishing the various encoding functions.

Figure 7:
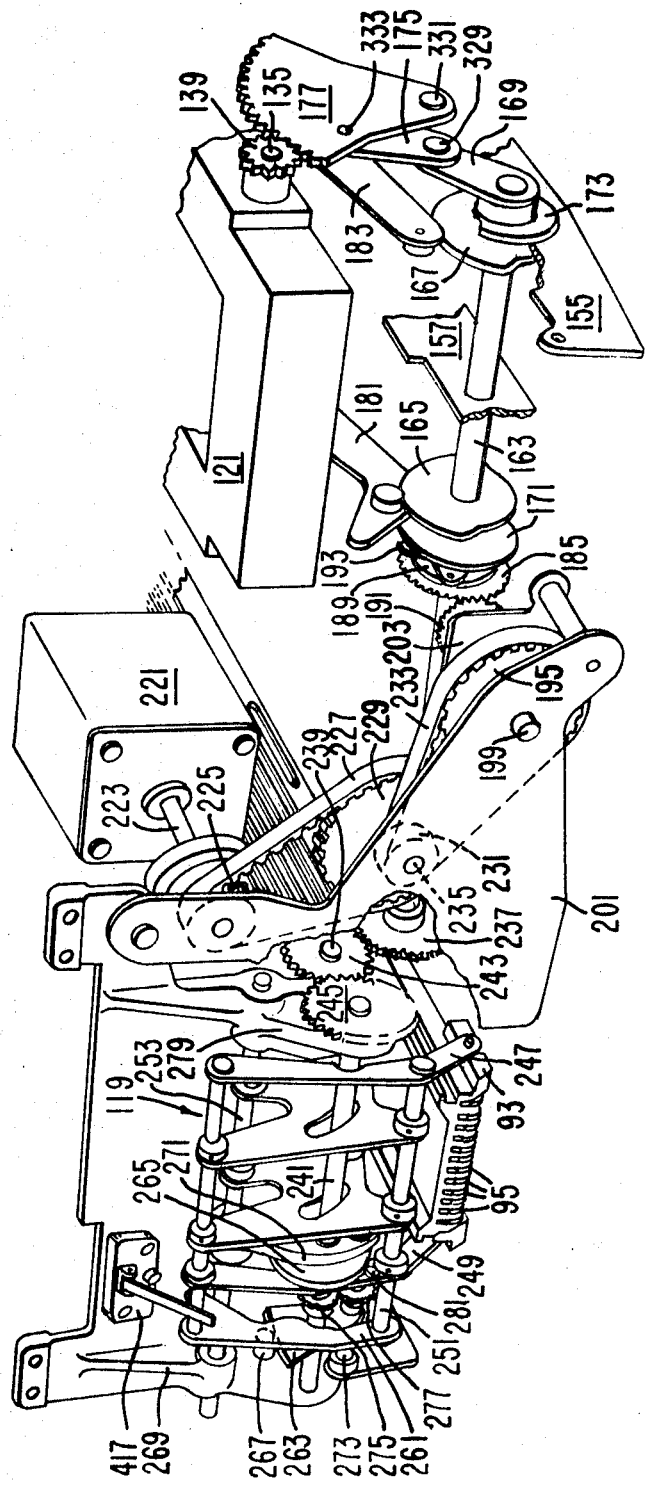
FIGURE 7 is a partial rear perspective view of the machine taken from the left rear corner showing the improved drive means for effectively activating the various encoding functions.

With reference to FIGURE 7, an encoder drive shaft 163 disposed across the rear of the machine is journaled in casting members of the machine base (not shown). Affixed to the drive shaft 163 is a spur gear 237, a circular plate 189, and a crank 169. The spur gear 237 is attached to the rightmost extremity of the drive shaft 163 (leftmost extremity as viewed in FIGURE 7) and is rotationally operative to activate the drive plate 93 both forwardly and rearwardly through the rotating action of the drive plate rocker assembly 119. Circular plate 189 is disposed at an intermediate point on the shaft 163 and is cooperable with a rotating bevel clutch gear 185 during an encoding operation to rotationally activate the drive shaft 163 in a counterclockwise direction. The crank 169 is attached to the leftmost extremity of the drive shaft 163 (rightmost extremity as viewed in FIGURE 7) and is effective at a predetermined point in the encoding operation to laterally activate the impressor roller 125 across the surface of the indexed encoding wheels. The encoder drive shaft 163 also comprises rigidly affixed cams 165 and 167, which cooperate with a pair of detent slides 181 and 183 to effectively activate the detent shaft 115 and the detent blade 117 into engagement with the intermediate code wheels and the encoding wheels, respectively, and rigidly affixed cams 171 and 173, which cooperate with a pair of bellcranks 313 (FIGURE 11) to effectively activate the head section 121 forwardly into encoding position. The bevel clutch gear 185 and a notched hub 187 affixed thereto (FIGURE 8) are supported by and are freely rotatable on the drive shaft 163 and are connectible to the drive shaft 163 through a clutch dog 193 carried by the circular plate 189, as will be explained in greater detail in succeeding paragraphs.

An auxiliary drive shaft 241 (FIGURE 7) is disposed to the right of the encoder drive shaft 163 (to the left thereof as viewed in FIGURE 7) and is connected therewith by means of the spur gear 237, an intermediate spur gear 243 which rotates on a shaft 239, and a spur gear 245 which is fixed to the leftmost extremity of the auxiliary drive shaft 241. The latter drive shaft 241 is journaled within casting members 271 and 279 and comprises a fixed cam 265 and a fixed gear 275. A shaft 273 is journaled within the casting members 269 and 271 and comprises a fixed cam 263 and a fixed gear 277, the latter gear having its teeth cooperatively meshed with the teeth of the gear 275 to effectively transfer the rotational movement of the auxiliary drive shaft 241 to the shaft 273.

The electric motor of the printing calculator has an extended shaft 223, the rearmost extremity of which is journaled in a pulley mounting plate 201. A notched pulley 225 attached to the outer end of the motor shaft 223 is connected by means of a belt 227 to a large notched pulley 229 which is freely rotatable on a short shaft 235 also journaled in the pulley mounting plate 201. A notched hub 231 attached to the large notched pulley 229 rotates in unison with the latter pulley on the short shaft 235. The notched hub 231 is connected to a second large notched pulley 195 by means of a belt 233. The pulley 195 is fixed to a shaft 199 which is also journaled in the pulley mounting plate 201 and in an auxiliary frame member 203. A bevel gear 191 (better shown in FIGURE 8) is is fixed to the opposite end of the shaft 199 and is maintained in right angle engagement with the bevel clutch gear 185, which, as previously mentioned, is freely rotatable on the encoder drive shaft 163. Accordingly, the clockwise rotation of the motor shaft 223 (as viewed in FIGURE 7) is imparted to the bevel gear 191 by means of pulley and belt connections, and is translated into a counterclockwise rotation of the bevel clutch gear 185.

Figure 8:
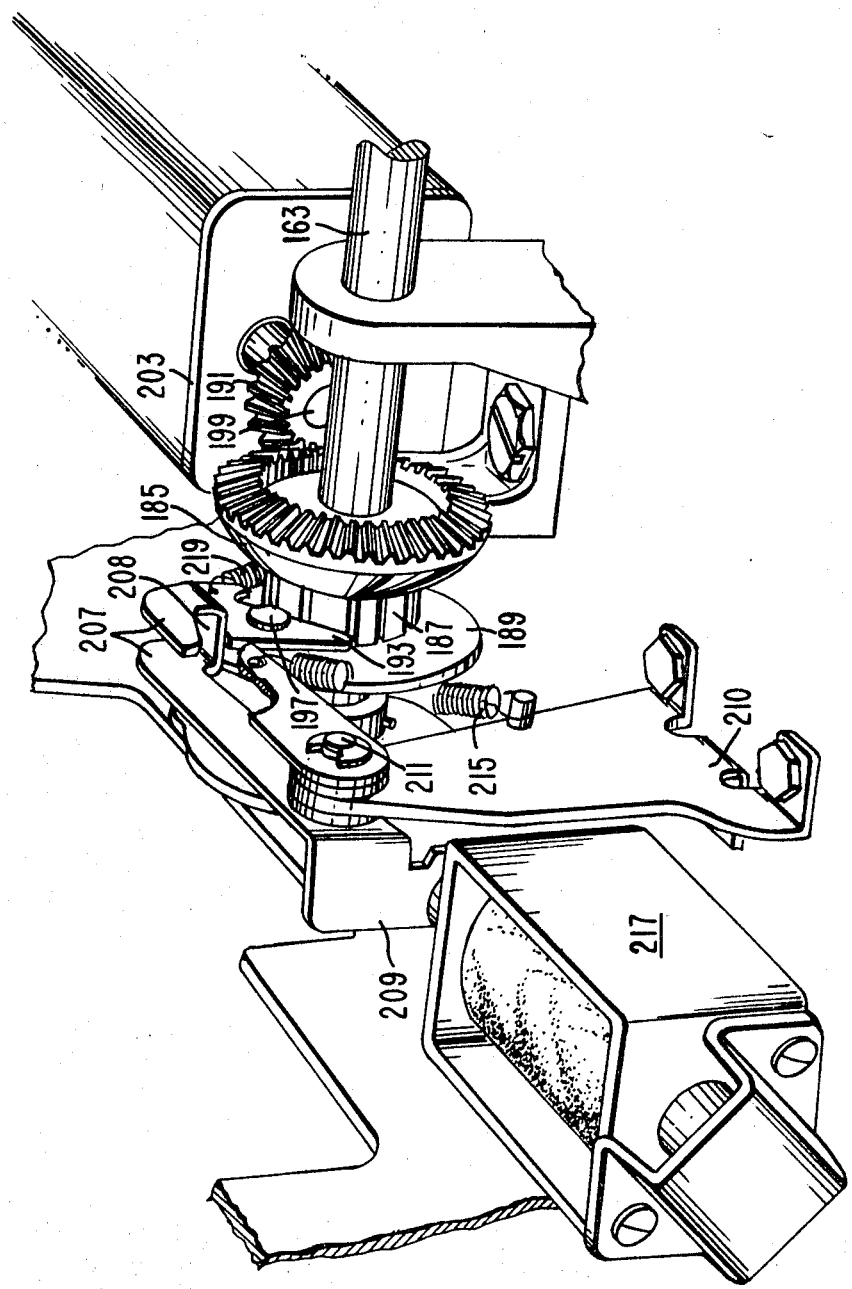
FIGURE 8 is a partial front view of the improved drive means shown in FIGURE 7 showing the encoder clutch in greater detail.

With reference to FIGURE 8, which shows the encoder drive shaft 163 and the related clutch mechanism from the front of the machine, the bevel clutch gear 185 and the notched hub 187 affixed thereto are rotated in a clockwise direction by the bevel gear 191. As previously mentioned, the circular plate 189 is fixed to the drive shaft 163, whereas the bevel clutch gear 185 and the hub 187 are normally permitted free rotation on said shaft. The clutch dog 193 is attached to the circular plate 189 by means of a rivet stud 197 about which the clutch dog 193 is free to pivot. A spring 219 is attached to one end of the clutch dog 193 and to a stud attached to the circular plate 189 (not shown), and normally biases the clutch dog 193 in a clockwise direction so that its vertical projection engages a notch in the notched hub 187. With the vertical projection of the clutch dog 193 thus positioned in a notch of the notched hub 187, clockwise rotation of the bevel clutch gear 185 is transmitted to the encoder drive shaft 163 to thereby activate the various encoding functions. A double-armed latch 207 is pivotally connected to a support member 210 by a short shaft 211, and is normally biased in a clockwise rocket position by a spring 215. When biased in its clockwise rocked position by the spring 215, a connecting member 208 of the double-armed latch 207 effectively holds the clutch dog 193 in its cleared position with respect to the notches in the notched hub 187, against the bias of the spring 219, such positioning of the clutch dog 193 being accomplished by contact of the connecting member 208 against the forward upper surface of the clutch dog 193.

A solenoid 217, when in its de-energized state, permits the spring 215 to hold the double-armed latch 207 in its normal clockwise-rocked position, to thereby hold the clutch dog 193 in disengaged relationship with the notched hub 187. When the solenoid 217 is energized, however, its plunger contacts an offset projection 209 of the double-armed latch 207, to effectively rock the latter in a counterclockwise direction against the bias of the spring 215. The spring 219 is accordingly permitted to rock the clutch dog 193 in a clockwise direction into engagement with a notch in the notched hub 187. Initiation of an encoding operation, is therefore dependent upon the energization of the solenoid 217 and the resultant coupling of the rotating bevel clutch gear 185 and the circular plate 189 of the encoder drive shaft 163.

As viewed in FIGURE 7, a 360° counterclockwise revolution of the encoder drive shaft 163, and of the attached crank 169, cams 173, 167, 165 and 171, and of the spur gear 237, occurs during each encoding operation. The countercockwise rotation of the spur gear 237 causes the gear 245 and the auxiliary drive shaft 241 to be rotated in a counterclockwise direction through the cooperation of the intermediate gear 243. At an early point in the counterclockwise rotation of the auxiliary drive shaft 241, the cam 265 attached thereto contacts a roller 281 affixed to an arm 249 of the drive plate rocker assembly 119, to thereby rock the latter assembly a limited counterclockwise distance about its pivot shaft 253 which is journaled in the casting members 269, 271 and 279. Coincidentally with the counterclockwise rotation of the cam 265 and the auxiliary shaft 241, the shaft 273 journaled in the casting members 269 and 271 is rotated in a clockwise direction through the cooperation of the gears 275 and 277. Clockwise rotation of the shaft 273 causes its fixed cam 263 to be withdrawn in a clockwise direction from a roller stud 267 attached to the outer surface of an arm 261 of the rocker assembly, such withdrawal thereby permitting the counterclockwise rotation of the rocker assembly 119. The counterclockwise rocking of the assembly 119 results in the forward activating motion of the drive plate 93 (rearward motion as viewed in FIGURE 7), the drive plate 93 being attached to the drive plate rocker assembly 119 by means of the arms 247 and 249. As previously explained, in relation to FIGURE 4, forward motion of the drive plate 93 releases the offset projections 94 of the code racks 95 and permits the latter racks to be moved forwardly by the springs 97 to be limited by the contact of the auxiliary sectors 87 against the studs 85 of the preindexed sensing arms 83.

Late in the 360° counterclockwise rotation of the encoder drive shaft 163 and the auxiliary drive shaft 241, the clockwise moving cam 263 fixed to the shaft 273 contacts the roller stud 267 of the drive plate rocker assembly 119 and rocks the latter assembly in a clockwise direction on its pivot shaft 253, such rocking being effective to restore the rocker assembly 119 and the drive plate 93 to their respective home positions. As previously indicated in connection with FIGURE 4, the rearward restoration of the drive plate 93 is effective to restore the code racks 95 and the code bars 105 to their rearward and forward home positions, respectively.

Figure 10:
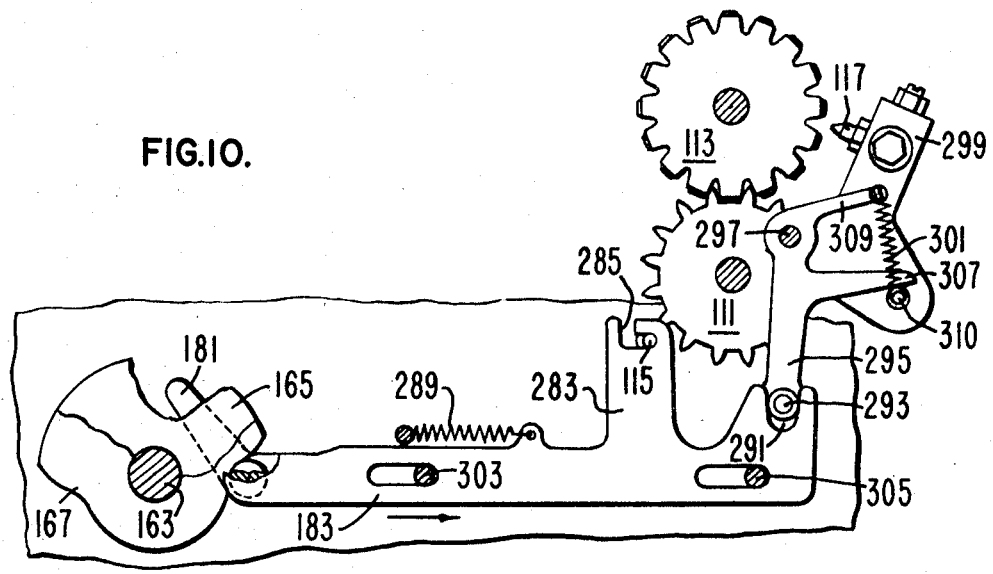
FIGURE 10 is a sectional left side elevation of detenting means in relationship with the encoding wheels.

As shown in FIGURES 9 and 10, the cams 165 and 167 of the encoder drive shaft 163 are aligned with rollers attached to the detent slides 181 and 183, respectively, the latter slides being slidably supported by shafts 303 and 305 (FIGURE 10) disposed between the stationary frame members 155 and 157 (FIGURE 9). Each of the detent slides 181 and 183 comprises an upright projection 283 in the upper portion of which is formed an open-ended L-shaped slot 285 in which the two extremities of the detent shaft 115 (FIGURE 10) are operatively positioned. Each of the detent slides 181 and 183 also comprises a slot 291 formed in its foremost portion to accommodate a shoulder stud 293 attached to the lower extremity of a bellcrank 295, one of said bellcranks 295 being pivotally attached to the inner surface of each of the stationary frame members 155 and 157 by means of a stud 297. A detent bail 299, comprising the detent blade 117, is pivotally attached to this pair of studs 297. Forwardly extending projections 307 and 309 of the bellcranks 295, together with a stud 310 disposed on the outer surface of either arm of the bail 299, and a spring 301 connecting the projection 309 of either bellcrank and the stud 310 on either arm of the bail, provide a yieldable connection between the detent slides 181 and 183 and the detent bail 299, for safely activating the detent blade 117 into and out of engagement with the notches in the encoding wheels 113. When the detent slides 181 and 183 are located in their rearward inactivated position, as provided by the bias of springs 289, the projection 307 of each bellcrank 295 serves to hold the detent blade 117 disengaged from the notches of the encoding wheels 113 by means of a clockwise exertion against the studs 310 in the arms of the bail 299. The rearward biasing of the detent slides 181 and 183 by the springs 289 is also effective to hold the detent shaft 115 disengaged from the teeth of the intermediate wheels 111, against the bias of a pair of springs 287 (FIGURE 9). At a predetermined point in the 360° rotation of the encoder shaft 163, the cams 165 and 167 activate the detent slides 181 and 183 forwardly (to the right as viewed in FIGURE 10), such forward activation causing the forward extremities of the open-ended L-shaped slots 285 to release the shaft 115 which is thereupon activated by the bias of the springs 287 into engagement with the teeth in the intermediate wheels 111. The forward activation of the detent slides 181 and 183 is also effective to rock the bellcranks 295 in a counterclockwise direction on the studs 297, to thereby cause the detent bail 299 to be rotated in a counterclockwise direction by the springs 301, such rotation serving the actuate the detent blade 117 into engagement with the notches in the encoding wheels 113.

Figure 11:
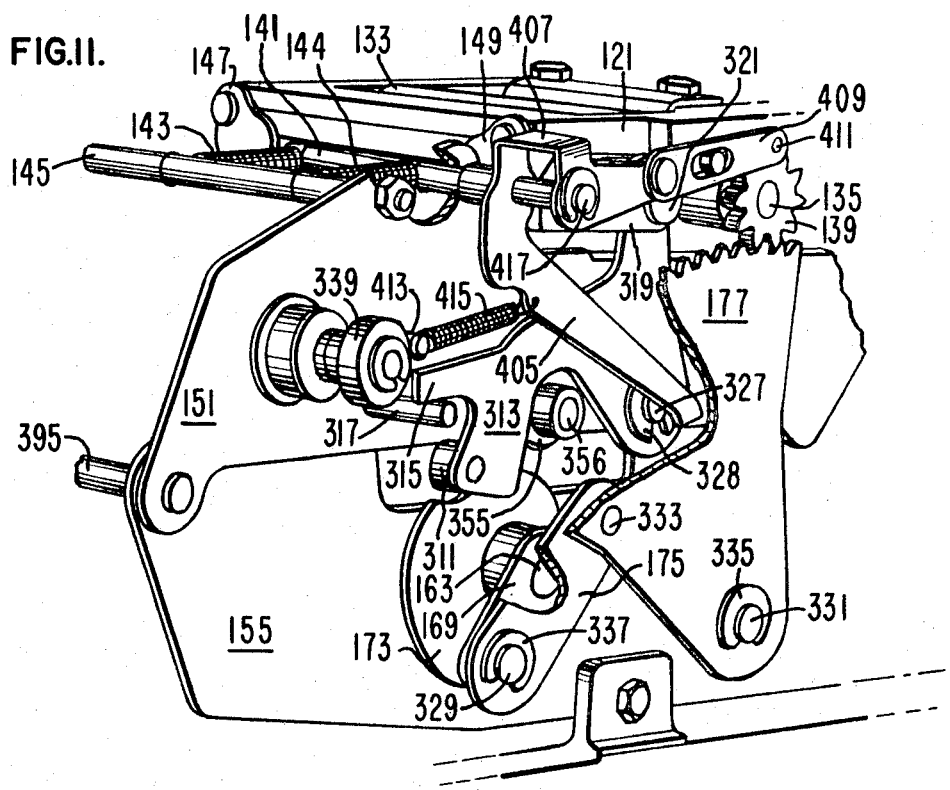
FIGURE 11 is a partial perspective view taken from the left rear corner showing parts that are operative in advancing the head section and in transversely moving the impressor roller across the surface of the indexed wheels.

At another predetermined point in the 360° rotation of the encoder drive shaft 163, the encoder head section 121 (FIGURE 7) is actuated forwardly (rearwardly as viewed in FIGURE 7) into encoding position by the cams 171 and 173, as can best be described with reference to FIGURE 11. A bellcrank 313 is pivotally attached to the outer surface of each of the tiltable frame members 151 and 153 by means of a stud shaft 327, and is retained on the stud shaft by a fastener 328. A roller 311 is rotatably attached to the inner surface of each bellcrank 313, one of such rollers being aligned with each of the cams 171 and 173. An upright portion of each of the bellcranks 313 is pivotally attached to a bifurcated link member 319 by means of a shoulder stud 321, each of the links 319 being pivotally attached to a rod 323 extending outwardly from the vertical side surfaces of the head section 121, and each being retained on its respective rod by a fastener 325. A projection 315 of each bellcrank 313 limits against a stud 317 disposed on the outer surface of either tiltable frame member 151 or 153. The head section 121 is normally held in its rearward inactive position, as previously mentioned, by the springs 143 and 144, such inactive position being defined by the extensions 315 limiting against the studs 317. At the predetermined point in the rotation of the drive shaft 163, the cams 171 and 173, through contact with the rollers 311, rock the bellcranks 313 in a clockwise direction on the stud shafts 327. This rotation of the bellcranks 313 is effective to move the head section 121 forwardly (to the right as viewed in FIGURE 11) into encoding position, by means of the shoulder studs 321, the links 319 and the rods 323. Upon completion of an encoding operation, the head section 121 is restored to its rearward inactive position by the springs 143 and 144.

The crank 169 attached to the leftmost extremity of the encoder drive shaft 163 (rightmost extremity as viewed in FIGURE 7) is pivotally attached to a link 175 by means of a grooved stud 329, which link is in turn pivotally attached to a segment 177 by means of a rivet stud 333. The segment 177 is rotatably carried on a shaft 331 journaled within the machine side frames, and the upper portion of the segment 177 comprises teeth which cooperate with the pinion 139 of the head section 121. As seen in FIGURE 11, the link 175 is retained on the grooved stud 329 by means of a fastener 337, and the segment 177 is retained on the shaft 331 by means of a fastener 335. When the encoder drive shaft 163 is located in its home position, the segment 177 is located in its counterclockwise rocked position on the shaft 331, and the pinion 139 of the head section 121 is located in its maximum clockwise rotated position, as provided by the closed or folded relationship of the crank 169 and the link 175. With the segment 177 and the pinion 139 located in their counterclockwise and clockwise rocked positions, respectively, the impressor roller 125 is held in its rightpost position (leftmost position as viewed in FIGURE 12) by the roller stud 131 and the spiral groove 137 of the cam roller 133. During an early stage in the rotation of the encoder drive shaft 163, the segment 177 (FIGURE 11) is rotated in a clockwise direction by the crank 169, and the pinion 139 is thereby rotated in a counterclockwise direction to effectively activate the impressor roller 125 in a leftward direction (rightward direction as viewed in FIGURE 12). During a later stage in the rotation of the encoder drive shaft 163, the segment 177 (FIGURE 11) is rotated in a counterclockwise direction on the shaft 331 to thereby activate the impressor roller 121 in a rightward direction (leftward direction as viewed in FIGURE 12) through the clockwise rotation of the pinion 139. As will be understood from an explanation of encoding functions set forth in subsequent paragraphs, the preliminary transverse movement of the impressor roller (rightward movement as viewed in FIGURE 12) constitutes an idling motion since it occurs at a time when the head section 121 is located in its rearward inactive position, and the ensuing transverse movement of the roller (leftward movement as viewed in FIGURE 12) effectively constitutes the encoding process, since it occurs after the head section 121 has been activated forwardly into contact with the encoding wheels.

Ribbon mechanism

With reference to FIGURE 13, the mechanism for positioning and feeding the magnetic inked ribbon that is required for the encoding operation generally comprises the tiltable frame members 151 and 153, the connecting shafts 159, 354 and 395, a supply spool 343 and a rewind spool 341, and the ribbon guiding and feeding mechanism explained in succeeding paragraphs.

As illustrated in FIGURE 6, the magnetic inked ribbon is guided from the underside of the supply spool 343, around a curved plate 345 and into a vertical span juxtaposed between the curve plate and a ribbon guide shaft 349, around the guide shaft 349 and a pressure shaft 347, over a pair of pressure rolls 359 and 357, under a feed roller 355 disposed intermediate the pressure rolls 359, and 357, to the underside of the rewind spool 341.

With reference to FIGURE 13, the pressure shaft 347 extends through slots in the tiltable frame members 151 and 153, and its leftmost extremity is fitted into an aperture in a vertical arm 351 to form a spring anchor 348. A spring 352 is attached to the spring anchor 348 and to a stud 350 fixed to the tiltable frame member 151. When a supply of magnetic inked ribbon is properly positioned on the ribbon guide mechanism, as previously described, a tautness in the ribbon exerts an upward lifting pressure against the shaft 347, to thereby hold the shaft and the connnected vertical arm 351 in their respective uppermost positions against the bias of the spring 352. When however the tautness in the ribbon is lost, due either to ribbon depletion or the occurrence of slack, the shaft 347 and the vertical arm 351 are lowered by the spring 352 to thereby activate a switch (designated at 353 in FIGURE 15) to effectively channel current to the ribbon warning lamp 31 (FIGURES 1 and 15). The pressure rolls 357 and 359 (the latter appearing only in FIGURE 6) are carried by a pressure roll assembly 361 which comprises a shaft 365 fixed to the frame members 151 and 153, a sleeve 367 which is rotatable on the shaft 365, and arms 363 and 369 which are fixed to the sleeve 367. The arm 369 is a pressure release arm and comprises an offset foot at its lowermost extremity. A spring 370 attached to the offset foot of the arm 369 and the tiltable frame member 151 provides a clockwise bias to the pressure roll assembly 361 to thereby hold the pressure rolls 357 and 359 in pressurized contact with the feed roller 355.

The feed roller 355 is attached to a shank 356 which is journaled in a pair of bearings 358 disposed in the tiltable frame members 151 and 153. A toothed member 377 of the feed roller 355 is fixed to the shaft 356 and to the rightmost extremity of the feed roller, the teeth thereof being arranged for counteclockwise activational movement. A rotatable blank member 371 is freely carried on the rightmost portion of the shaft 356 adjacent the toothed member 377, and is normally held in its clockwise rocked position by a spring 383 attached to the blank member 371 and to a stud 385 disposed in the tiltable frame member 153, such clockwise rocked position being defined by the blank members rearward upper surface limiting against the shaft 365. A rachet pawl 375 is rotatably carried on the frontmost portion of the blank member 371 by means of a pin 379, said rachet pawl being biased in a counterclockwise direction on the pin 379 by a spring 381. The counterclockwise bias of the rachet pawl 375 is effective to hold its spearpoint into engagement with a tooth in the toothed member 377. A depending projection 373 of the blank member 371 lies in the forward moving path of an upturned portion of the detent slide 181, which slide, as previously explained, is activated forwardly by the cam 165 (FIGURE 10) during activation of the detent shaft 115 and the detent blade 117. The forward movement of the detent slide 181 is accordingly effective also to rock the blank member 371 in a counterclockwise direction against the bias of the spring 383, such counterclockwise rocking of the blank member 371 being effective to rotate the feed roller 353 a one-tooth counterclockwise distance by means of the rachet pawl 375. The one-tooth counterclockwise rotation of the feed roller 355 effectuates a corresponding rearward movement (leftward movement as viewed in FIGURE 13) of the magnetic linked ribbon, which, as previously stated, is held in an impinged state between the pressure rolls 357 and 359 and the feed roller 355.

The counterclockwise rotation of the feed roller 355 is also effective to rotate the rewind spool 341 a corresponding clockwise distance (counterclockwise distance as viewed in FIGURE 6) through the cooperation of a pulley 401 attached to the rightmost extremity of the shaft 356, a twisted spring belt 403, and a pulley 399 attached to the rightmost surface of the rewind spool 341. Upon completion of an encoding operation, preceding which the magnetic inked ribbon has been advanced a one-tooth distance as measured by the teeth of the toothed member 377 (FIGURE 13), the detent slide 181 is restored rearwardly to its home position by means of its spring 289 (FIGURE 10), to thereby release the depending projection 373 of the blank member 371. The blank member 371 is accordingly rotated in a clockwise direction by the spring 383, until limited by the shaft 365. This clockwise rotation of the blank member 371 causes the rachet pawl 375 to rachet over and to become engaged with the adjoining tooth of the toothed member 377, preparatory for a subsequent advancement of the ribbon during a succeeding encoding operation. The magnetic inked ribbon may also be advanced or properly positioned in the guide mechanism through manual manipulation of a knob 339 (disposed on the left side of the rewind spool 341) and a knob 397 (FIGURE 6) disposed on the right side of the supply spool 343.

The encoder head section, head advancing mechanism, and the ribbon guidance and feeding mechanism are contained within a frame structure defined by the tiltable frame members 151 and 153, and by the shafts 159, 354 and 395 (FIGURE 13). This complete mechanism is tiltable upwardly on the shaft 395, for ribbon changing purposes, by simply lifting upwardly on the shaft 159.

A latch 161 is pivotally attached to the frame member 153 and cooperates with a stud 391 disposed on the stationary frame member 157, thereby serving to secure the tilted ribbon mechanism in its upright position for a convenient accommodation of the ribbon changing process. A spring 389 attached to a stud in the latch 161 and to a stud 387 disposed in the tiltable frame member 153 serves to bias the latch in a counterclockwise direction to thereby assure a secure engagement of the curved portion of a slot 393 formed in the latch 161 with the stud 391 when the tiltable mechanism is moved to its upright position.

When the tiltable frame mmebers 151 and 153 and related mechanism are located in their lowered operating position, a lower arm 405 of a detenting bellcrank 407 is held in its counterclockwise rocked position (as viewed in FIGURE 13) by means of a stud (not shown) disposed in the stationary frame member 155. With the arm 405 so held, against the bias of a spring 415 attached to a stud 413 of the tiltable frame member 151, a detent arm 409 of the detenting bellcrank is also held in its counterclockwise position wherein a stud 411 disposed in the forward extremity thereof is held clear of the teeth of the pinion 139. When the tiltable frame members 151 and 153 are tilted upwardly to the upright latched position, the arm 405 is moved away from the stud in the stationary frame member 155 to thereby allow the spring 415 to rock the detenting bellcrank 407 in a clockwise direction. The stud 411 is accordingly moved into engagement with the teeth of the pinion 139. This detenting of the pinion 139 prevents the impressor roller 125 (FIGURE 12) from shifting away from its home position due to an inadvertent rotation of the shaft 135 and the cam roller 133.

Electromechanical controls

The preferred embodiment of the invention, which provides for the magnetic ink encoding of amounts entered in a calculator keyboard, comprises various electromechanical controls which are best illustrated in FIGURE 15, such controls being shown in conjunction with simplified circuitry suitable for accomplishing both a non-encoding operation involving only the printing calculator, and for accomplishing an encoding operation involving both the printing calculator and the encoding mechanism itself.

A switch 417 (also shown in FIGURE 7) is closably activated by the counterclockwise rocking of the drive plate rocker assembly 119, as viewed in FIGURE 7, to thereby maintain the motor 221 of the printing calculator in its operative state throughout the 360° rotation of the encoder drive shaft 163.

A switch 419 is closably activated by the detent slide 183 (FIGURE 10) when the detent blade 117 is activated into engagement with the encoding wheels 113.

Switches 421 and 433 are closably activated by a secondary drive mechanism 423 (FIGURE 14) of the printing calculator.

A solenoid 425 (also shown in FIGURE 14) is energized during a non-encoding operation when switches 437, 435 and 421 are closed, and during an encoding operation when the switch 419 is also closed, to thereby break the toggle 427 shown in FIGURE 14 to initiate the return stroke of the calculator.

The switch 37 (also shown in FIGURE 1) is manually activated to "encode" position at the outset of an encoding operation.

A bipole switch 353 is normally biased to channel current through various document switches to a relay 47, and is re-positioned by the vertical arm 351 shown in FIGURE 13 to divert the current away from its relay path and to the ribbon warning lamp 31 (also shown in FIGURE 1) when a fault develops in the magnetic inked ribbon.

Switches 39, 41 and 43 are closably activated by the proper positioning of a check in the document chute 35 (FIGURE 1) and against the limit plate 67 (FIGURE 3), to complete the channeling of current through the switch 353 and to the relay 47.

A solenoid 217 (also shown in FIGURE 8) is energized by current supplied to the relay 47 when the switch 433 is closed, to thereby activate the encoder drive shaft clutch mechanism shown in FIGURE 8 to initiate a 360° revolution of the encoder drive shaft 163.

Switches 437 and 435 are closably activated by the depression of a motor bar in the keyboard of the printing calculator, to thereby channel current to a solenoid 439.

A solenoid 45 is energized during an encoding operation by means of current supplied by the relay 47 when the switches 353, 39, 41 and 43 are closed, to thereby activate the check holding mechanism illustrated in FIGURE 3.

The solenoid 439 is energized during both an encoding and a non-encoding operation when the switches 437 and 435 are closed, to thereby initiate a forward stroke of the printing calculator.

A diode 441 prevents the energization of the solenoids 45 and 217 during a non-encoding operation.

During a non-encoding operation involving the mechanism of the printing calculator only, the switch 37 is conditioned to channel current away from the document switches 39, 41 and 43 and away from the encoding solenoids 45 and 217. Depression of a motor bar during such an operation results in closing the switches 435 and 437 to thereby energize the solenoid 439. A machine operation, involving only the calculator, is thereby initiated through the tripping of the calculator clutch. When the secondary drive section 423 (FIGURE 14) of the printing calculator completes its forward stroke, the switch 421 is closed to thereby energize the solenoid 425 and to break the toggle 427 (FIGURE 14) to initiate the return stroke of the calculator.

During an encoding operation, the switch 37 is first of all moved to "encode" position, whereupon current is channeled in the direction of the switch 353. When the switch 353 is conditioned by the presence of a satisfactory ribbon, current is channeled through the switch 353 in the direction of the document switches 39, 41 and 43. When the latter three switches are closed, by the proper positioning of a check in the encoding station, current is channeled through the relay 47 and in the direction of the solenoids 217 and 45, the latter solenoid thereby being energized to securely hold the check in the encoding station throughout the encoding operation. Upon depression of a motor bar, the switches 437 and 435 are closed to thereby energize the solenoid 439, such solenoid thereupon being effective to trip the calculator clutch and to initiate the forward machine stroke of the encoding operation. During this forward machine stroke, the encoding wheels 113 (FIGURE 9) are moved to their indexed positions through means previously described. The switches 421 and 433 are closed as the secondary section 423 (FIGURE 14) completes its forward stroke, the closing of the latter switch being effective to energize the solenoid 217 to thereby activate the encoder drive clutch mechanism illustrated in FIGURE 8. During the ensuing revolution of the encoder drive shaft 163, the switch 417 is closed through the counterclockwise rotation of the drive plate rocker assembly 119 (FIGURE 7), to thereby retain the motor 221 in its operative state throughout the encoding operation, and the switch 419 is closed through the rearward activation of the detent slide 183 (FIGURE 10) as the detent blade 117 is moved into the teeth of the encoding wheels 113, to thereby complete the circuit to the solenoid 425 to effectively break the toggle 427 (FIGURE 14) and to initiate the return stroke of the printing calculator. Upon completion of the encoding operation, and the 360° revolution of the encoder drive shaft 163 (FIGURE 7), the switch 417 is opened through the clockwise rotation of the drive plate rocker assembly 119, to thereby terminate the encoding machine cycle. During an encoding operation in which a ribbon fault occurs, the bipole switch 353 is repositioned by the vertical arm 351 (FIGURE 13) to thereby channel the current away from the relay 47 and from the solenoids 45 and 217, to the ribbon warning lamp 31.

A detailed explanation of an encoding operation, involving the sequence of operation of both the mechanical and electromechanical elements, is presented in a subsequent section under the title "Encoder Functions."

Toggle mechanism

As disclosed in U.S. Patent 1,853,050, the drive mechanism of the Burroughs Series P line of machines comprises a primary section 443 (partially illustrated in FIGURE 14) and the secondary section 423 to which reference has previously been made. The primary section 443 is driven a predetermined distance in a clockwise direction by a source of motor power such as the motor 221 shown in FIGURE 7, and the secondary section 423, under the restraining control of a dash pot (not shown) is urged in a clockwise direction by a torsion spring 445, the combination thereby allowing sufficient time for the indexing and positioning of related parts and mechanisms. The secondary section 423 is accordingly permitted to lag behind the primary section 443 during an erratic or excessively rapid forward machine stroke, or during a machine operation in which an excessive number of parts or mechanisms are to be indexed or otherwise positioned. This lag between the primary section 443 and the secondary section 423 is accommodated by a toggle-type locking device designated at 427 in FIGURE 14.

This toggle device 427 is comprised of links 429 and 431 which are pivotally connected by a shoulder stud 469 to form a scissors-like toggle which assumes a semi-folded position as illustrated in FIGURE 14 when the machine is at rest, and which opens to substantially form a straight line when the primary section 443 is positioned at the terminal end of its predetermined clockwise rotation. The link 429 is pivotally attached to a stud 453 in the calculator side frame 465, and is biased in a counterclockwise direction by a spring 457. The link 431 is pivotally attached to a stud 455 disposed on the primary section 443. A latch 447 is pivotally attached to the side frame 465 by means of a shoulder stud 451, and is biased in a counterclockwise direction by a spring 449 which is also attached to the side frame 465. A link 459 is pivotally connected to the latch 447 by means of a shoulder stud 461, and pivotally connected also to a solenoid bail 463 by means of a stud 460 and a fastener 462, said bail 463 being pivotally attached also to the side frame 465 and to the solenoid 425.

During the forward stroke of the calculator, the primary section 443 is activated a predetermined distance in a clockwise direction by the motor 221. Clockwise rotation of the primary section 443 causes the links 429 and 431 to assume an open straight-line position, as assisted by the spring 457. At the point of maximum clockwise advancement of the primary section 443, an offset projection 473 of the latch 447 engages a notch 471 of the link 429, such engagement being accomplished through the bias of the spring 449. As the secondary section 423 completes its predetermined clockwise rotation, as motivated by the torsion spring 445, the switches 421 and 433 (FIGURE 15) are closed as hereinbefore explained, the closing of the switch 421 being effective to energize the solenoid 425. Energization of the solenoid 425 is effective to rock the solenoid bail 463 in a clockwise direction, and to rock the latch 447 in a clockwise direction through the link 459, to thereby release the primary and secondary sections 443 and 423 to initiate the return stroke of the calculator. It should be pointed out that the links 429 and 431 assume an open position which falls slightly short of forming a straight line, when the projection 473 engages the notch 471. With the links so positioned at the end of the forward machine stroke, the unlatching of the latch 447 from the notch 471 permits the primary and secondary sections 443 and 423 to be driven in a counterclockwise direction through conventional spring means to effectuate the return stroke of the printing calculator.

Encoder functions

A brief explanation of an encoding operation as performed by the preferred embodiment of the invention is set forth in the following paragraphs, which will serve to explain also the coordination of the mechanical and electromechanical controls and functions described in the preceding paragraphs. This explanation presents the various facets of an encoding operation, in proper sequence, from its inception to its conclusion, at which latter point both the printing calculator and the encoding section are restored to their normalized states.

As previously indicated, an encoding operation is initiated by: manually activating the switch 37 (FIGURE 1) to its "encode" position; properly positioning a check in the document chute 35; depressing amount keys 23 in the keyboard of the printing calculator; and depressing a motor bar such as motor bar 33 shown in FIGURE 1, whereupon the following functions and operations occur:

(1) Proper positioning of a check in the document chute 35 closes the switches 39, 41 and 43 (FIGURE 15) to thereby energize the solenoid 45 (FIGURE 3) and to move the ball tips 57 into impinging contact with the check and the frontplate 51 through activation of the cam shaft 65.

(2) Depression of the motor bar 33 (FIGURE 1) closes the switches 437 and 435 (FIGURE 15) to thereby energize the solenoid 439 and to initiate the forward stroke of the printing calculator, during which forward stroke the following functions occur:

(3) The adding sectors 75 (FIGURE 4), type bars 79, and sensing arms 83 are moved to their indexed positions.

(4) The toggle 427 (FIGURE 14) is locked at the end of the forward stroke by engagement of the offset projection 473 with the notch 471 of the link 429.

(5) The switches 421 and 433 (FIGURE 15) are closed as the secondary section 423 (FIGURE 14) completes its forward stroke, the closing of the switch 433 being effective to energize the solenoid 217 (FIGURE 8) and to initiate a 360° rotation of the encoder drive shaft 163 through activation of the clutch dog 193, during which 360° rotation the following functions occur:

(6) The drive plate 93 (FIGURES 4 and 7) is activated forwardly through the rocking of the drive plate rocker assembly 119 (FIGURE 7), the forward movement of the drive plate 93 being effective to release the code racks 95 (FIGURE 4) to permit their forward positioning by means of the studs 85 of their respective sensing arms 83.

(7) The encoding wheels 113 (FIGURE 9) are rotated to their indexed positions through the forward activation of the code racks 95 (FIGURE 4) and the rearward activation of the code bars 105.

(8) The impressor roller 125 (FIGURE 12) idles across the encoding wheels from right to left (from left to right as viewed in FIGURE 12), such idling motion being completed at the approximate 100° point in the 360° rotation of the shaft 163.

(9) The encoder head section 121 (FIGURE 11) is advanced toward the indexed encoding wheels (in a rightward direction as viewed in FIGURE 11) between the 150° and 160° points in the 360° rotation of the shaft 163.

(10) The intermediate wheels 111 (FIGURE 10) and the encoding wheels 113 are fully detented by the detent shaft 115 and the detent blade 117, respectively, at the approximate 180° point in the 360° rotation of the encoder drive shaft 163, such detenting being sustained until the approximate 335° point in the shaft's rotation.

(11) The switch 419 (FIGURE 15) is closed by the detent slide 183 during the detenting action of the detent blade 117 (FIGURE 10) at the approximate 180° point in the 360° rotation of the encoder drive shaft 163, to thereby energize the solenoid 425 (FIGURE 14) and to initiate a return machine stroke, during which return stroke the indexed amount is processed by the printing calculator.

(12) The impressor roller 125 (FIGURE 12) is driven from left to right (from right to left as viewed in FIGURE 12), beginning at the approximate 166° point in the 360° rotation of the encoder drive shaft 163 and ending at the approximate 343° point, to thereby effectuate the encoding of the indexed amount on the check.

(13) The encoder head section 121 (FIGURE 11) is restored to its rearward home position by the springs 143 and 144 at the approximate 350° point in the 360° rotation of the encoder drive shaft 163.

(14) The drive plate 93 (FIGURES 4 and 7) is also restored to its rearward home position at the approximate 350° point in the rotation of the encoder shaft 163.

It should be noted that the encoding wheels 113 are retained in their indexed positions by the detent shaft 115 and the detent blade 117 (FIGURE 10), afer the code racks 95 and the code bars 105 have been restored to their home positions, such flexibility being provided by the toothed slides 107 (FIGURE 6) and the springs 109.

(15) The encoding wheels 113 (FIGURE 10) are released by the detent shaft 115 and the detent blade 117 immediately preceding completion of the 360° rotation of the encoder drive shaft, whereupon the intermediate wheels 111 and the encoding wheels 113 are restored to their home positions by the toothed slides 107 (FIGURE 6), as the latter slides are activated forwardly on their respective code bars 105 by the springs 109.

While the invention has been described with respect to a preferred embodiment thereof, it will be understood that the invention and its various features are capable of changes and variations which are within the spirit and scope of the following claims.

We claim:

1. Unitary calculating and encoding apparatus having a frame portion; means for securely positioning a record medium to be encoded; a plurality of depressible keys; means responsive to predetermined ones of said depressible keys for driving said apparatus through cycles of operation; actuating means cooperable with said cycling means; a plurality of encoding elements each comprising a rotatable wheel having a plurality of spaced-apart code characters disposed along the periphery thereof; means cooperating with said actuating means and responsive to other predetermined ones of said depressible keys for selectively positioning said encoding elements; detenting means for securely positioning said selectively positioned encoding elements; ribbon means including an inked ribbon suitable for encoding; an impressor roller; means for moving said impressor roller into and out of contact with said encoding elements; means for transversely activating said impressor roller across said selectively positioned encoding elements; and control means effective for activating said cycling means and said actuating means, said means for selectively positioning said encoding elements additionally comprising:

(a) a plurality of index bars limitably associated with said other predetermined ones of said depressible keys, each of said bars corresponding in order to the order of the depressible keys by which it is limited, (b) a plurality of adding sectors associated with said plurality of index bars, each of said sectors being rotationally activated by said means for driving said apparatus through cycles of operation, (c) a plurality of sensing arms each of which is fixed to a corresponding one of said adding sectors and each comprising also limit means disposed thereon, (d) a plurality of auxiliary sectors associated with said adding sectors and with said sensing arms, each of said auxiliary sectors being rotationally limited by said limit means of its associated sensing arm, (e) a plurality of auxiliary pinions cooperating with said auxiliary sectors, each of said pinions being rotationally activated on a common supporting shaft by its associated auxiliary sectors, (f) a plurality of slideable code racks longitudinally disposed beneath said auxiliary sectors and cooperably associated with said auxiliary pinions, each of said code racks having an offset projection associated with said actuating means and each being displaceable by the rotation of its associated pinion, (g) a shaft assembly associated with each order of said slideable code racks, said assembly comprising a latitudinally disposed shaft and a pair of pinions substantially fixed at either end thereof, the rightmost pinion of said pair of pinions being cooperably associated with a slideable code rack of corresponding order, (h) a plurality of slideable code bars longitudinally disposed to the left of said longitudinally disposed code racks, each of said code bars being cooperatively associated with the leftmost pinion of said pair of pinions of said shaft assembly of corresponding order, each of said code bars comprising a forwardly biased toothed slide, and (i) a plurality of intermediate code wheels associated with said slideable code bars and with said rotatable wheels comprising said encoding elements, each of said intermediate code wheels cooperating with said forwardly biased toothed slide of said slideable code bar of corresponding order to selectively position its respective encoding element upon activation of said actuating means by said means for driving said apparatus through cycles of operation.

2. The apparatus defined in claim 1 wherein said detenting means for securely positioning and selectively positioned encoding elements adidtionally comprises:

(a) a movable shaft associated with said plurality of intermediate code wheels, (b) a bail comprising a detent blade associated with said rotatable wheels comprising said encoding elements, (c) a pair of bellcranks associated with said bail and with said detent blade, and (d) a pair of longitudinally disposed slides associated with said movable shaft and with said pair of bellcranks, said slides being effective to blockingly engage said movable shaft with said intermediate code wheels and said detent blade with notches separating said spaced-apart code characters disposed along the periphery of said rotatable encoding wheels when said actuating means is activated, and to disengage said shaft and said blade from said intermediate wheels an said encoding wheels when said actuating means is deactivated.

3. The apparatus defined in claim 1 wherein said means for securely positioning said record medium additionally comprises:
(a) a pair of vertically disposed, complementary, spaced-apart plates, said spacing between said plates forming a channel into which record medium may releasably be inserted, each of said plates comprising a formed cutout of predetermined size and shape defining an area of encoding,
(b) a pair of bottom-edge surfaces disposed on either side of said cutouts defining said area of encoding, said surfaces being associated with said control means,
(c) a limit plate disposed at the rightmost extremity of said channel formed by said pair of vertically disposed spaced-apart plates, said limit plate comprising the right-edge limit for a record medium when properly positioned within said channel,
(d) a plurality of finger springs attached to and depending from the outer surface of a predetermined one of said vertically disposed plates, each of said finger springs comprising a ball tip extending inwardly from the surface thereof into an aperture formed in said predetermined one of said plates and in the direction of the other of said plates,
(e) a rotatable cam shaft cooperable with said finger springs on the side opposite the side comprising said ball tips,
(f) a plunger lever rigidly attached to one extremity of said cam shaft, said lever being so biased as to normally hold the raised surface of said cam shaft clear of said finger springs, and
(g) a first solenoid the plunger of which is pivotally attached to said plunger lever, said first solenoid, when energized by said control means, being effective to rock said plunger lever and said cam shaft such that the raised surface of said cam shaft contacts said finger springs and forces said ball tips against said record medium and said other of said vertically disposed plates.

4. The apparatus defined in claim 1 wherein said actuating means comprises drive shaft means disposed within a base portion of said apparatus, said drive shaft means additionally comprising:
(a) crank means effective for alternately activating said impressor roller in opposing transverse directions relative to said encoding elements,
(b) a first pair of cams effective for moving said impressor roller into contact with said encoding elements and to thereafter permit said roller to be moved out of contact therefrom,
(c) a second pair of cams effective for activating said detenting means associated with said encoding elements,
(d) a bevel clutch gear having a notched hub appended to one side thereof, said bevel gear being rotatable on said drive shaft means by said means for driving said apparatus through cycles of operation, and
(e) a circular plate fixed to said drive shaft means adjacent said notched hub of said bevel clutch gear, said plate comprising a biased clutch dog effective for engaging a notch in said notched hub.

5. The apparatus defined in claim 4 wherein said actuating means additionally comprises:
(a) a drive plate guideably associated with said plurality of slideable code racks and blockably associated with said offset projections of said code racks, said drive plate being movable forwardly to release said offset projections to thereby permit said selective positioning of said encoding elements, and being also movable rearwardly to restore said code racks through said offset projections,
(b) a drive plate rocker assembly pivotally connected to said drive plate and to said frame portion, said assembly being rockable in a first direction to move said drive plate forwardly and away from its blocking position relative to said offset projections of said slideable code racks, and rockable in a second direction to restore said drive plate and said slideable code racks to their respective home positions, and
(c) cam means comprising at least two separate cams fixed to said drive shaft means, a first of said separate cams being effective for rocking said drive plate rocker assembly in said first direction and a second of said separate cams being effective for rocking said assembly in said second direction.

6. The apparatus defined in claim 5 wherein said actuating means additionally comprises driving means including at least two pulleys and at least one continuous connecting web, one of said pulleys being rotatably connected to said means for driving said apparatus through cycles of operation, and another of said pulleys being rotatably connected to a bevel gear cooperably associated with said bevel clutch gear of said drive shaft means, the activation of said means for driving said apparatus through cycles of operation thereby imparting rotational motion to said bevel clutch gear of said drive shaft means.

7. The apparatus defined in claim 6 wherein said actuating means additionally comprises clutch means effective for coupling said rotating bevel clutch gear and said fixed circular plate of said drive shaft means by means of said biased clutch dog, to thereby impart said rotational motion of said bevel clutch gear to said drive shaft means, said clutch means additionally comprising:
(a) a biased latch having an offset projection, said latch being pivotally disposed in a common plane with said biased clutch dog, said bias of said latch being effective to overcome said bias of said clutch dog to thereby hold the latter disengaged from said notches in said notched hub attached to said bevel clutch gear, and
(b) a second solenoid associated with said control means and with said offset projection of said biased latch, the armature of said second solenoid being effective, upon energization of the latter by said control means, to rotate said latch against its normal bias and to thereby permit said clutch dog to engage a notch in said notched hub as motivated by its respective bias.

8. The apparatus defined in claim 7 wherein said means for driving said apparatus through cycles of operation additionally comprises:
(a) a primary drive mechanism,
(b) a secondary drive mechanism cooperably associated with said primary drive mechanism, said secondary mechanism being motivated through a forward stroke by means of a torsion spring, said torsion spring resiliently coupling said primary drive mechanism and said secondary drive mechanism,
(c) an electric motor responsive to said control means and effective for activating said primary drive mechanism and said drive shaft means, said activation of said primary drive mechanism being effective for driving said apparatus through a forward machine stroke during which said adding sectors and said rotatable wheels of said encoding elements are activated to their selectively indexed positions, and said activation of said drive shaft means being effective for operating said detenting means, said means for transversely activating said impressor roller, and said means for moving said impressor roller into and out of contact with said encoding elements, said activation of said drive shaft means comprising a 360° rotation of said means,
(d) toggle means associated with said primary drive mechanism and with said secondary drive mechanism, said means being effective to blockingly delay the inception of a return stroke of said apparatus until said adding sectors and said rotatable wheels are fully indexed,
(e) a third solenoid responsive to said control means and cooperably associated with said electric motor and with said primary drive mechanism, said solenoid being effective to initiate a forward stroke of said apparatus, and
(f) a fourth solenoid responsive to said detenting means and to said control means, said solenoid being effective to release said toggle means and to thereby permit the occurrence of said return stroke of said apparatus.

9. The apparatus defined in claim 8 wherein said control means additionally comprises:
(a) a first switch associated with electrical circuitry and with said ribbon means, said switch being effective to interrupt an encoding operation upon the occurrence of a fault in either the supply or positioning of said linked ribbon,
(b) a plurality of switches associated with said circuitry and effective to energize said first solenoid when a record medium is properly positioned in said apparatus, to thereby activate said means for securely positioning said record medium,
(c) a second switch associated with said circuitry and with said predetermined ones of said depressible keys, said switch being effective to energize said third solenoid when one of said keys is manually activated, to thereby initiate a forward stroke of said apparatus,
(d) a third switch associated with said circuitry and with said secondary drive mechanism, said switch being effective to energize said second solenoid when said secondary drive mechanism completes its forward stroke, to thereby activate said clutch means of said actuating means and to initiate said 360° rotation of said drive shaft means,
(e) a fourth switch associated with said circuitry and with said drive plate rocker assembly of said actuating means, said switch being effective to sustain said electric motor in an operative state throughout said 360° rotation of said drive shaft means, and
(f) a fifth switch associated with said circuitry and with said detenting means, said switch being effective to energize said fourth solenoid when said detenting means is fully operative, to thereby release said toggle means and to permit said initiation of a return stroke of said apparatus.

10. The combination of encoding and calculating apparatus within a common frame and case, said calculating apparatus having at least one accumulator, a plurality of depressible keys, differentially positionable adding sectors associated with predetermined ones of said depressible keys and with said accumulator, and cycling means responsive to other predetermined ones of said depressible keys, said encoding apparatus having means for securely positioning a record medium to be encoded, a plurality of differentially positionable encoding elements, ribbon means including an inked ribbon suitable for encoding, means for transversely pressing said positioned record medium into contact with said inked ribbon and said differentially positioned encoding elements, said combination comprising:
(a) means associated with said differentially positionable adding sectors effective for differentially positioning said encoding elements,
(b) actuating means associated with said encoding apparatus and responsive to said cycling means, said actuating means being effective for activating said means for differentially positioning said encoding elements and said means for transversely pressing a record medium into contact with said inked ribbon and said differentially positioned encoding elements, and
(c) control means associated with said ribbon means, said means for securely positioning a record medium to be encoded, and with said means for differentially positioning said encoding elements, said control means cooperably effectuating an encoding operation when said record medium, said encoding elements, and said inked ribbon are properly positioned, said control means being effective also to prevent the occurrence of an encoding operation when one or more of said conditions is not present.

References Cited

UNITED STATES PATENTS

| 3,018,721 | 1/1962 | Monticello et al. | 101—93 |
| 3,202,091 | 8/1965 | Dodsworth | 101—90 |
| 3,363,547 | 1/1968 | Thut et al. | 101—45 |

STEPHEN J. TOMSKY, Primary Examiner

U.S. Cl. X.R.

101—45, 93; 235—58, 60